Nov. 19, 1946.    I. W. GROTHEY    2,411,422
KNITTING METHOD AND MACHINE
Filed Sept. 29, 1942    14 Sheets-Sheet 4

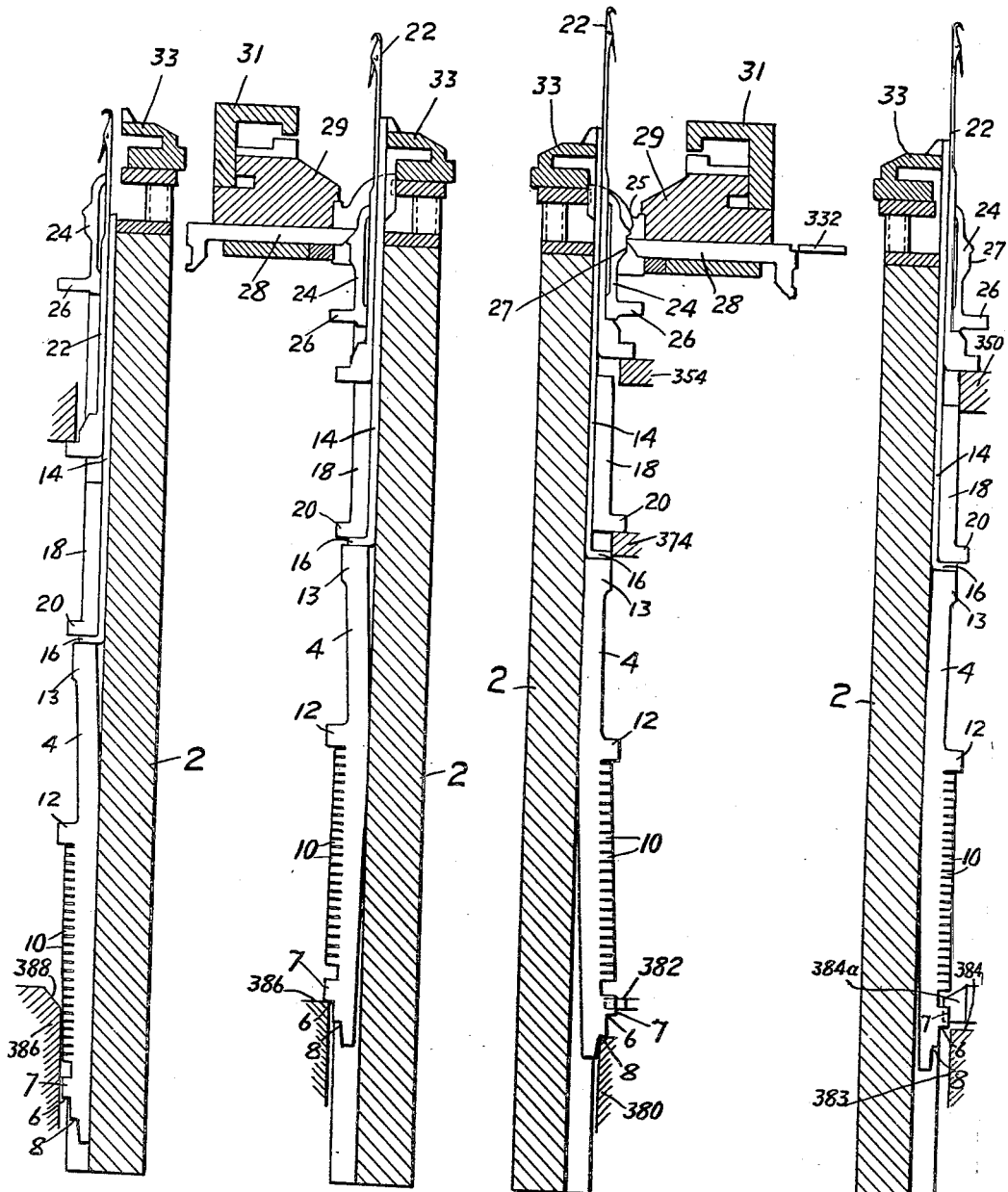

WITNESS:

INVENTOR
Ivan W. Grothey
BY
ATTORNEYS.

Nov. 19, 1946.  I. W. GROTHEY  2,411,422
KNITTING METHOD AND MACHINE
Filed Sept. 29, 1942  14 Sheets-Sheet 5

WITNESS:

INVENTOR
Ivan W. Grothey
BY
ATTORNEYS.

Nov. 19, 1946.  I. W. GROTHEY  2,411,422
KNITTING METHOD AND MACHINE
Filed Sept. 29, 1942  14 Sheets-Sheet 6

WITNESS:

INVENTOR
Ivan W. Grothey
BY
Busser & Harding
ATTORNEYS.

Nov. 19, 1946.  I. W. GROTHEY  2,411,422
KNITTING METHOD AND MACHINE
Filed Sept. 29, 1942  14 Sheets-Sheet 7

INVENTOR
Ivan W. Grothey
BY
Busser & Harding
ATTORNEYS

WITNESS:

Nov. 19, 1946.   I. W. GROTHEY   2,411,422
KNITTING METHOD AND MACHINE
Filed Sept. 29, 1942   14 Sheets-Sheet 8

WITNESS:

INVENTOR
Ivan W. Grothey
ATTORNEYS.

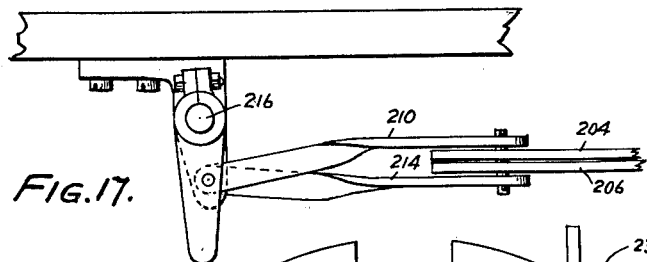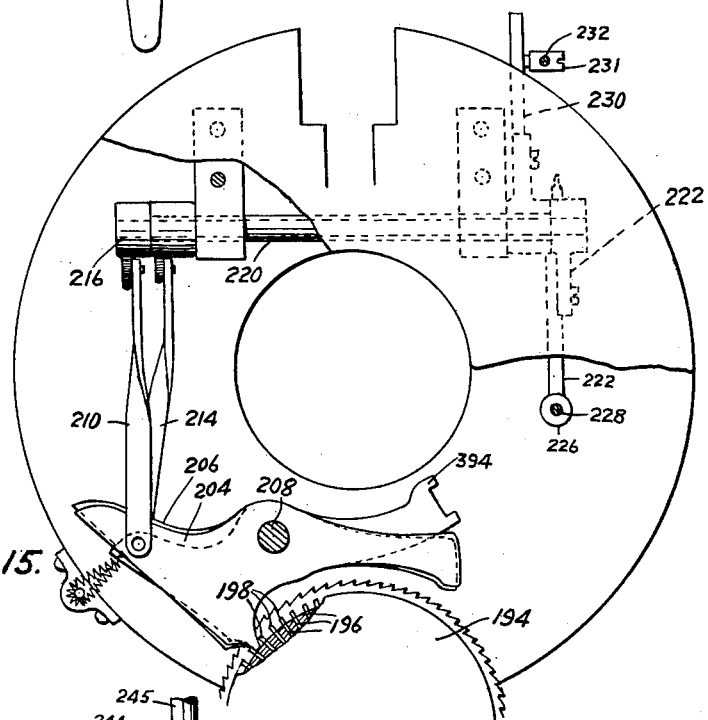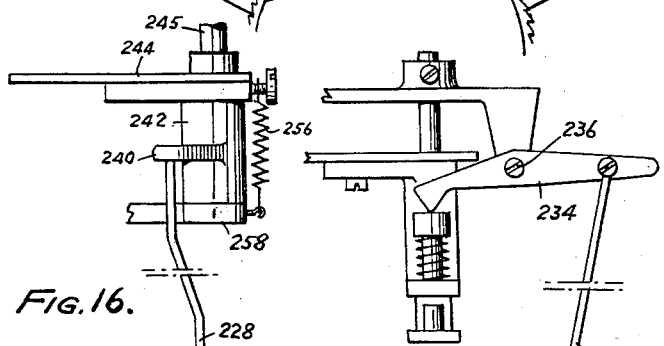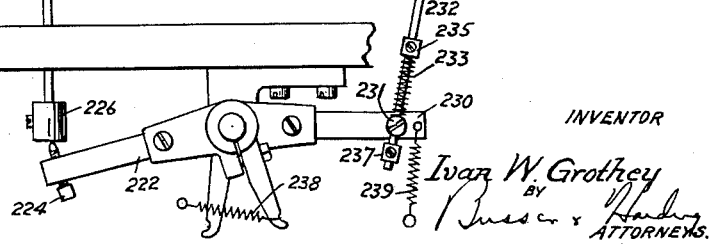

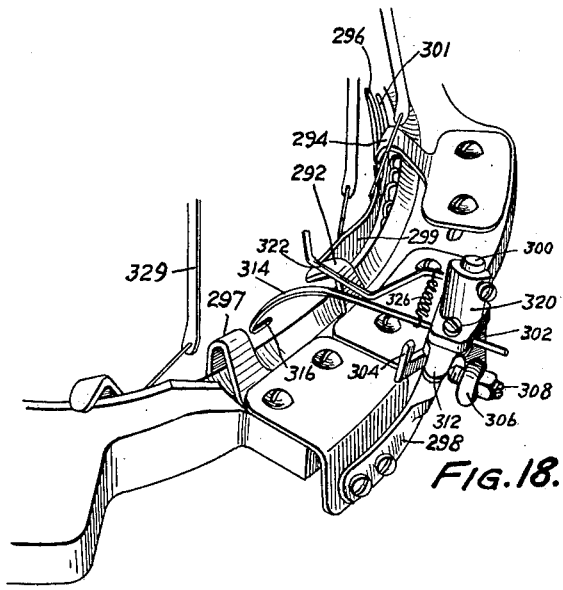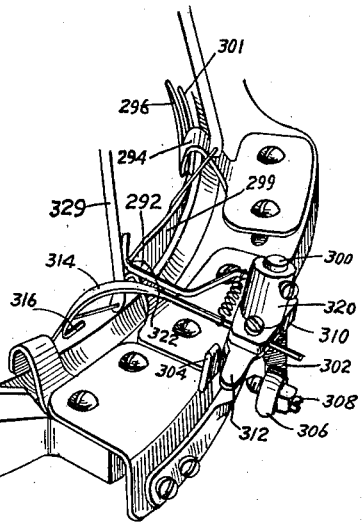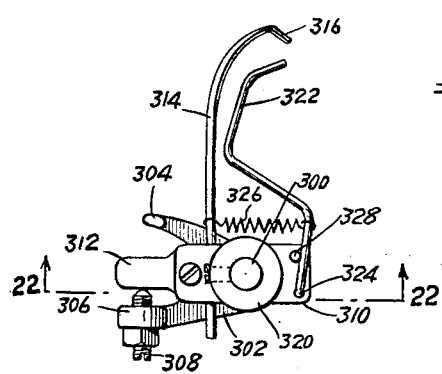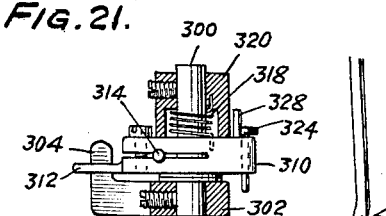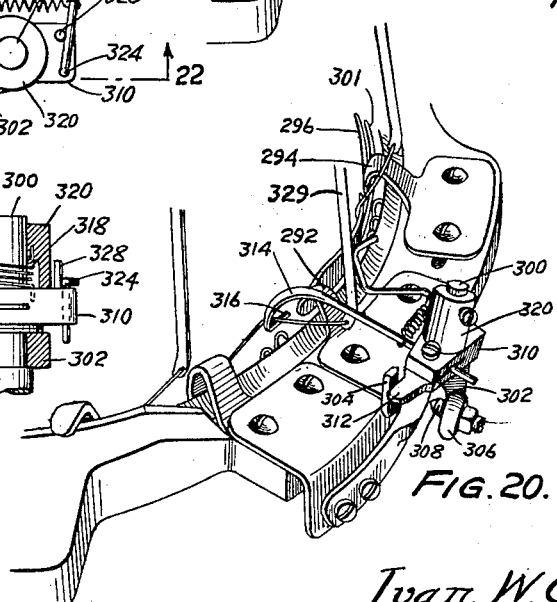

Nov. 19, 1946.  I. W. GROTHEY  2,411,422
KNITTING METHOD AND MACHINE
Filed Sept. 29, 1942  14 Sheets-Sheet 11
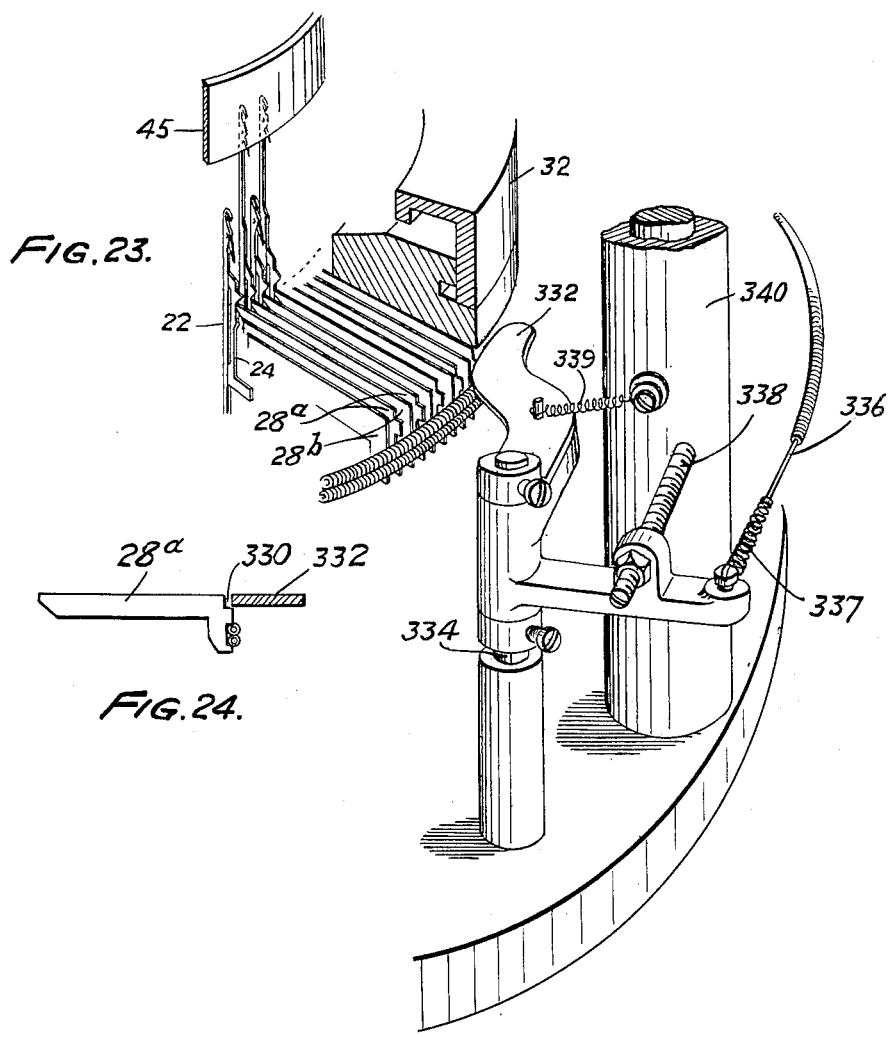
INVENTOR
Ivan W. Grothey
BY
Busser & Harding
ATTORNEYS.
WITNESS:

Nov. 19, 1946.  I. W. GROTHEY  2,411,422
KNITTING METHOD AND MACHINE
Filed Sept. 29, 1942  14 Sheets-Sheet 12

INVENTOR
Ivan W. Grothey
BY
ATTORNEYS.

Patented Nov. 19, 1946

2,411,422

UNITED STATES PATENT OFFICE 2,411,422

KNITTING METHOD AND MACHINE

Ivan W. Grothey, Laconia, N. H., assignor to Scott & Williams, Incorporated, Laconia, N. H., a corporation of Massachusetts Application September 29, 1942, Serial No. 460,048

38 Claims. (Cl. 66—135)

This invention relates to a knitting method and machine, and particularly to the construction and operation of a circular knitting machine having independent needles.

It is one object of the present invention to provide means for wrapping needles for the production of embroidery designs involving shogging of wrap yarn carriers through substantial angular ranges with respect to the needles. In particular, it is the object of the invention to provide independent shogging movements for a plurality of groups of wrap yarn carrying fingers. In the following description, the machine is disclosed as comprising two such groups arranged to be independently shogged, but it will be obvious that the principles of the invention are readily applicable to the shogging of additional groups of wrap yarn carriers.

A further object of the invention is concerned with the selection of yarn carriers to provide color changes in wrap patterns.

The selection mechanism is particularly designed to effect selection of at least some of the wrap yarn carriers or fingers in such fashion that the operating movements of the selecting means take place in timed relationship with the wrap yarn fingers rather than at some definite phase of rotation of the needle cylinder even though the pattern devices comprising, for example, a trick wheel or drum, may have movement imparted to it at a particular phase of the cycle of the needle cylinder, at which time it may directly effect other selection, for example of needles.

The invention has as still another object the provision of means for properly placing wrap yarns in position to be engaged by needles for the purpose of wrapping them. While the placing means referred to is of more general application, it is particularly desirable in a machine embodying other features of the present invention in order to insure the proper seizure of wrap yarns by the needles in knitting involving extreme shogging movements of the type indicated above.

A further object of the invention is the provisions of means for effecting selection of needles for wrapping and also for deflection for the purpose of reverse plating, as specifically disclosed, or for some other purpose, as for the production of patterns by the creation of selective floats. As will be evident from the following description, the mechanism is greatly simplified in spite of the performance of very elaborate functions by an interrelationship of the selections of needles for wrapping and for reverse plating or the like.

As will be evident hereafter, the interrelated controls for the production of wrapping and reverse plating impose some minor limitations upon the freedom of production of certain elaborate patterns, and it is a further object of the invention to provide a simple controlling arrangement for overcoming such limitation.

While various features of the invention are not limited thereto, it is a further object of the invention to provide for wrapping, and also for reverse plating, in a machine of automatic rib top type provided with dial needles to cooperate with cylinder needles. As will be obvious hereafter, various devices functioning in connection with the production of reverse plating have additional functions in connection with the matter of knitting by dial needles, these dual functions of certain elements resulting in a simplification to a substantial degree of mechanism capable of performing satisfactorily the various separate functions.

Another object of the invention is the provision of means for backing up cylinder needles during rib knitting to impart to them a substantial rigidity against inward deflection of their upper ends under the tension of stitches. The invention contemplates the simple effecting of this result by special manipulation of cleaning jacks of a type heretofore used.

Another object of the invention is the provision of means for lining up the hooks of the needles during the transfer of loops from dial needles to cylinder needles. Heretofore this has been accomplished by engagement of a cam with the hooks of needles in such fashion as to create a substantial possibility of damage to the needles. In accordance with the present invention, the alignment of the needles is effected by elements which are conventionally those utilized for the deflection of the needles in the production of reverse plating.

The invention comprises additionally the various manipulative methods involved in accomplishing the above objects.

The foregoing objects of the invention, together with other objects, particularly relating to details of construction and operation, will become clear from the following description, read in conjunction with the accompanying drawings, in which:

Figures 3, 4, 5 and 6 are, respectively, vertical sections taken through one side of the needle cylinder and its adjacent associated parts at the respective axial planes indicated in Figure 2 at 3—3, 4—4, 5—5 and 6—6;

Figure 15 is a fragmentary plan view, partly in section, showing in particular the mechanism for effecting selection of the wrap fingers;

Figure 16 is an elevation of certain elements of the machine concerned with the selection of the wrap fingers, the view being taken looking toward the left at the subject-matter of Figure 15;

Figure 17 is a fragmentary view of certain elements of the machine looking toward the right at the subject-matter of Figure 15;

Figures 18, 19 and 20 are perspective views showing successive stages of the cooperation of a yarn placer with a wrap yarn carrying finger;

Figure 21 is a view of the yarn placing elements of Figures 18, 19 and 20, looking in the direction of the axis of movement thereof;

Figure 22 is a section taken on the plane indicated at 22—22 in Figure 21;

Figure 23 is a perspective view showing in particular the devices whereby cylinder needles are aligned for the transfer of loops from dial needles to cylinder needles;

Figure 24 is a fragmentary sectional view showing the relationship of a controlling cam to a slider not adapted to be acted upon by said cam;

Figure 1:
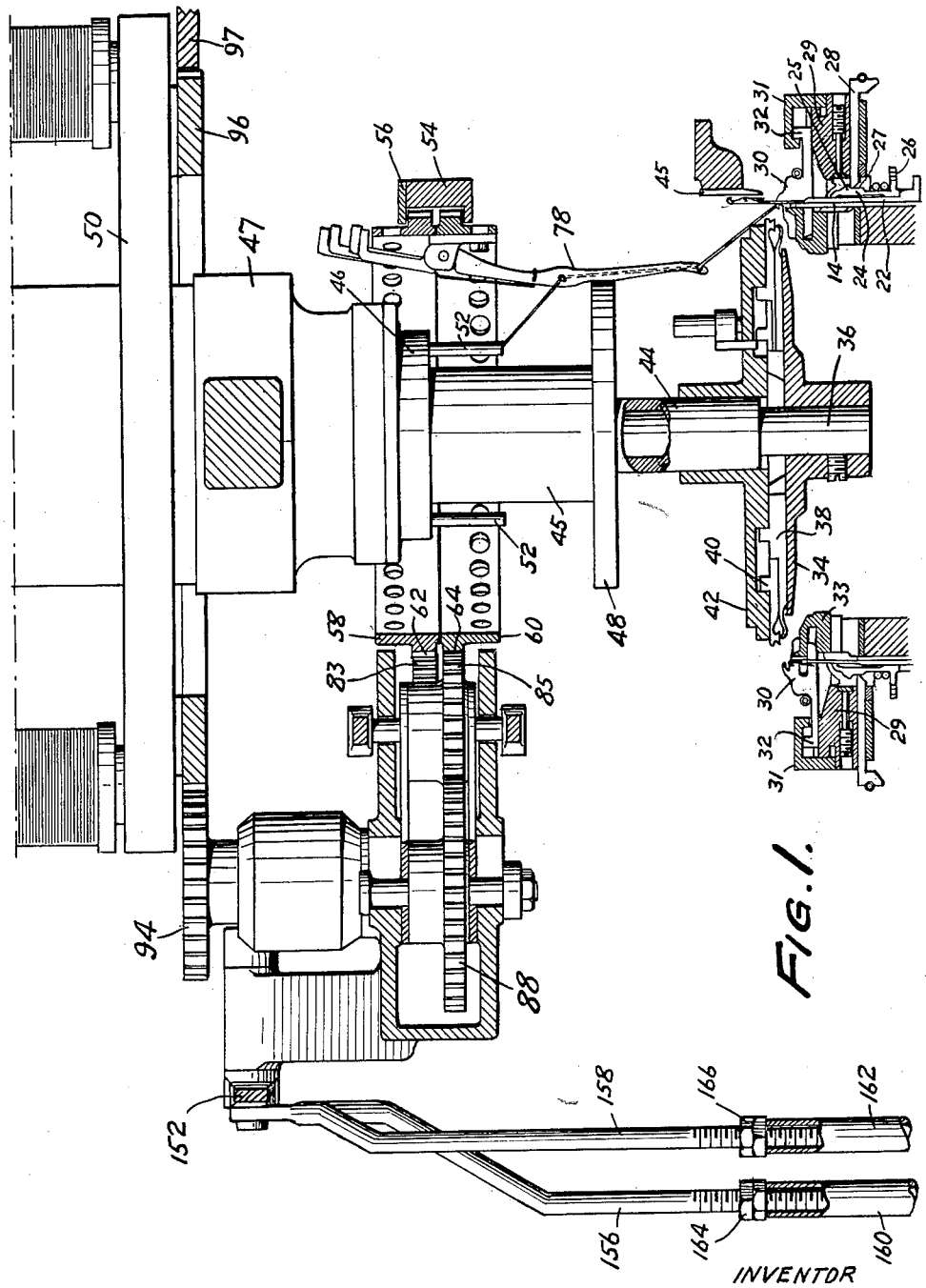
Figure 1 is a vertical section through the portion of a knitting machine in the vicinity of the upper end of the needle cylinder, the dial, and the wrap yarn carrying and shogging means, illustrating certain features of the invention.

The invention is illustrated as applied to a circular knitting machine for knitting a complete stocking including a rib top, the machine illustrated being basically of the Scott and Williams rotary cylinder type. The rotary needle cylinder of substantially conventional form and mounting is illustrated at 2 and is provided with axially extending slots within which needles and various elements associated therewith are slidably mounted. These elements, as will appear most clearly from Figures 3 to 6, include pattern jacks 4 provided at their lower ends with upper and lower steps or shoulders, respectively indicated at 6 and 8, there being a butt 7 provided above the upper step 6. Each jack is provided with a series of selectively removable butts 10 and carries intermediate and upper butts 12 and 13, respectively.

Above each pattern jack there is located a cleaning jack 14 provided with a butt 16 located between the upper end of the corresponding pattern jack and the butt 20 of a needle jack 18, which is located outside the cleaning jack. In each slot above the intermediate or needle jack 18 and also outside the cleaning jack 14, there is a needle 22, these needles being provided with conventional long and short butts or with other suitable arrangement of butts in the event that special split foot or other products are to be provided, in which case, for example, suture needles may be provided with intermediate length butts. Outside of the needles there are located presser jacks 24 provided with butts 26 of four different lengths and arranged to be acted upon by pressers 28 slidably mounted for radial movement in the lower part of the sinker dial 29. Sinkers 30 are supported by the sinker dial 29 and the inside sinker ring 33 (see Fig. 1), being provided with butts 32 in the usual fashion and arranged to be acted upon by cams carried by the sinker cap 31.

For the formation of rib tops, there is provided a needle dial 34 mounted upon the lower end of a vertical shaft 36, which is arranged to be rotated by suitable gearing in conventional fashion at the same speed and in definite relation to the needle cylinder, this shaft being vertically movable as usual to adjust the relationship between the needle dial and the needle cylinder. Two-part dial needles of conventional form, indicated at 38 and 40, are mounted in slots in the dial and are provided with butts to be acted upon by conventional cams carried by the dial cap 42, which is secured to a stationary sleeve 44. From the standpoint of its functions, the dial mechanism is substantially the same as that disclosed in Scott Patent 1,641,101, and the sinkers are of the types and arranged as set forth therein to cooperate in the formation of the stocking top.

The stationary sleeve 44 extends upwardly through a second stationary sleeve 45 which, at its lower end, is provided with a disc 48 serving as an inner abutment for certain wrap fingers which will be referred to hereafter. A rotating sleeve 46 mounted in a bearing at 47 has secured to it a plate 50 which is arranged to carry the bobbins and tension and take-up mechanisms supplying wrap yarn to the wrap fingers through individual tubes 52. See, for example, my Patent 2,053,192, dated September 1, 1936.

Figure 11:
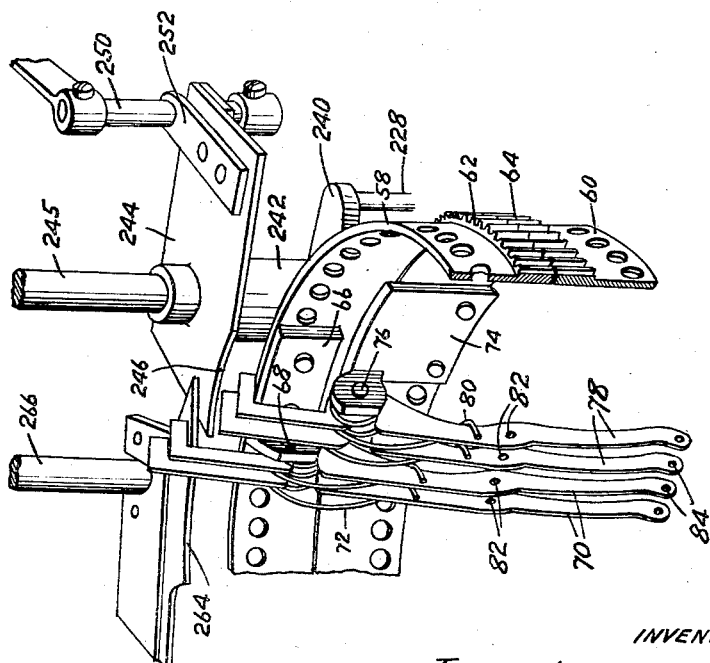
Figure 11 is a perspective view showing one arrangement of wrap yarn carriers and their supporting and selecting elements.
Figures 12, 14:
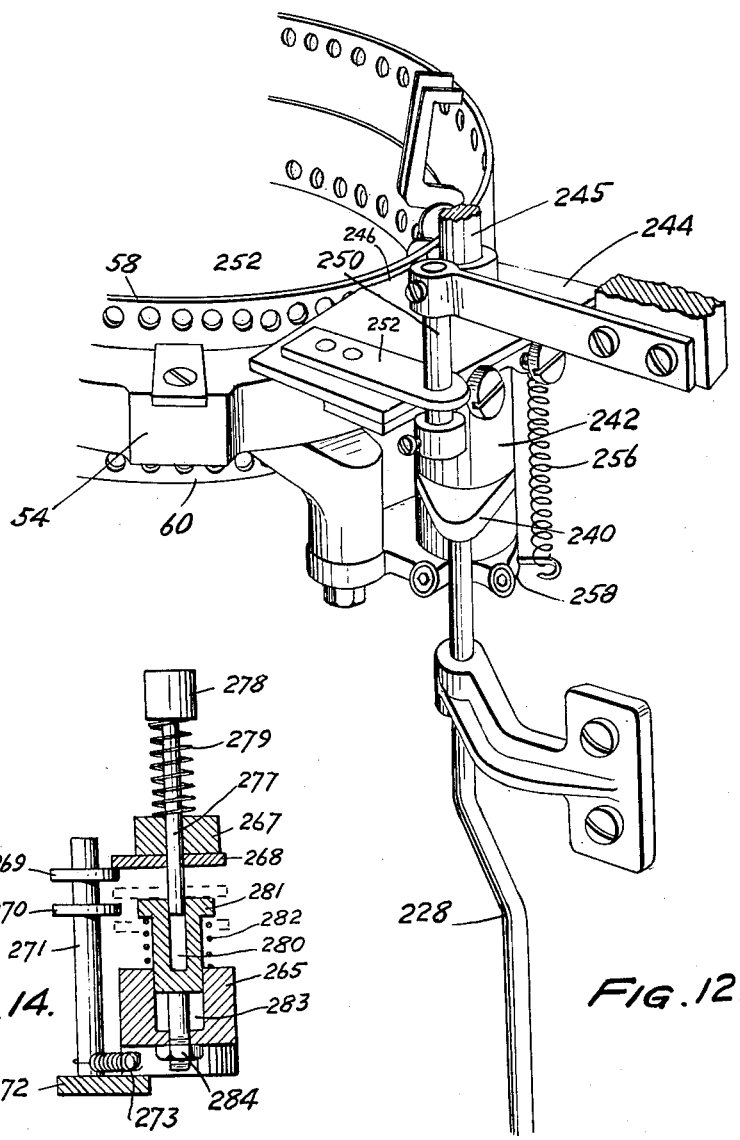
Figure 12 is a perspective view showing the controlling means for one of the wrap finger selecting cams.
Figure 14 is a vertical sectional view through certain of the elements of Figure 13.

A stationary casting 54, secured to the usual tilting head which supports the dial mechanism and, in the present machine, the wrap yarn supplying devices, provides an inwardly directed flange on which are rotatably mounted two rings 58 and 60 adapted to carry wrap fingers, these rings being provided with gear teeth 62 and 64 and being held assembled upon the flange of the casting 54 by means of clip members 56. The rings 58 and 60 are provided with perforations, as indicated in Figures 1, 11 and 12 for the reception of screws adapted to hold within the rings brackets 66 and 74. The bracket 66 is arranged to carry upon a pivot pin 68 a pair of wrap fingers 70 the lower ends of which are urged inwardly by springs 72 into contact with the disc 48 previously referred to. The bracket 74 similarly carries upon a pin 76 wrap fingers 78, also urged inwardly by springs indicated at 80. These wrap fingers are provided with yarn eyes 82 and 84, the latter serving for the guidance of the yarns in the proper paths for presentation to abutments and selected needles, as will be hereafter described. As will be more apparent later, there are in this modification four types of wrap fingers provided with butts at four different levels, i. e., wrap fingers arranged to be mounted on the brackets secured to the upper ring 58 and provided with butts at two different levels, and wrap fingers adapted to be secured to the lower ring 60 and also provided with butts arranged at two other levels with space between the pairs of levels for the purpose hereafter described. The brackets for the wrap fingers may be secured in various suitable positions on the rings 58 and 60, depending upon the type of pattern which is to be produced.

Figure 7:
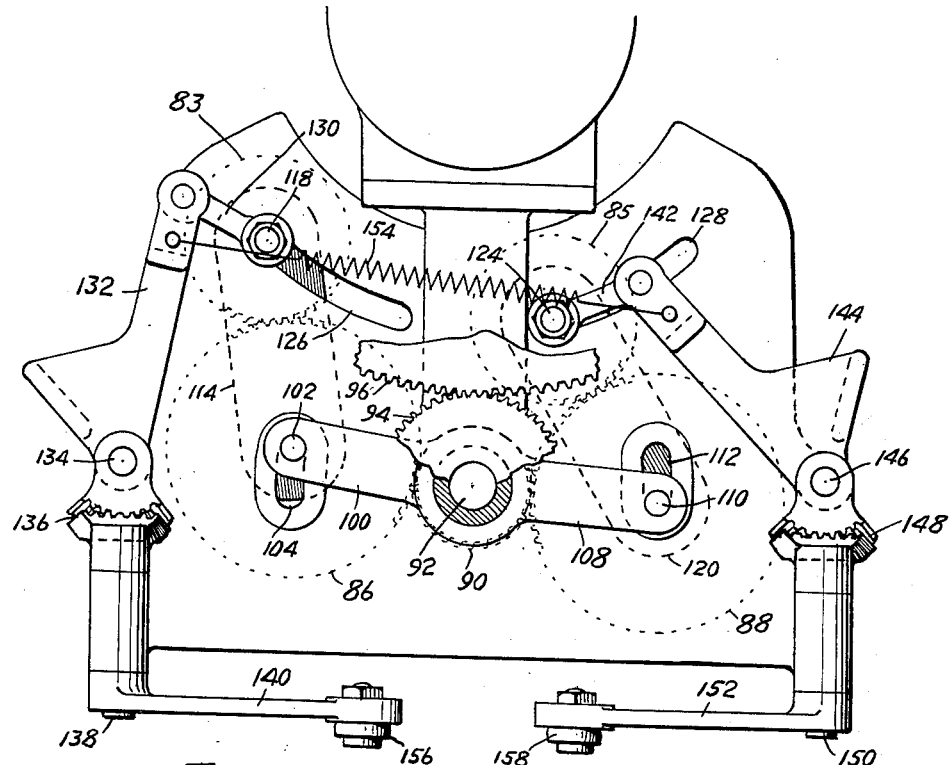
Figure 7 is a plan view, partly in section, showing a portion of the shogging controlling means.
Figure 8:
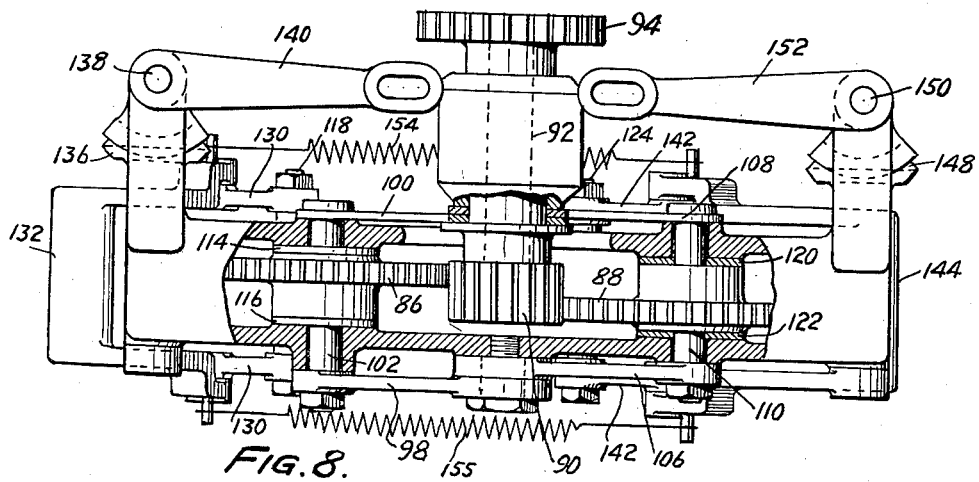
Figure 8 is an elevation of the same, partially in section.
Figures 9, 10:
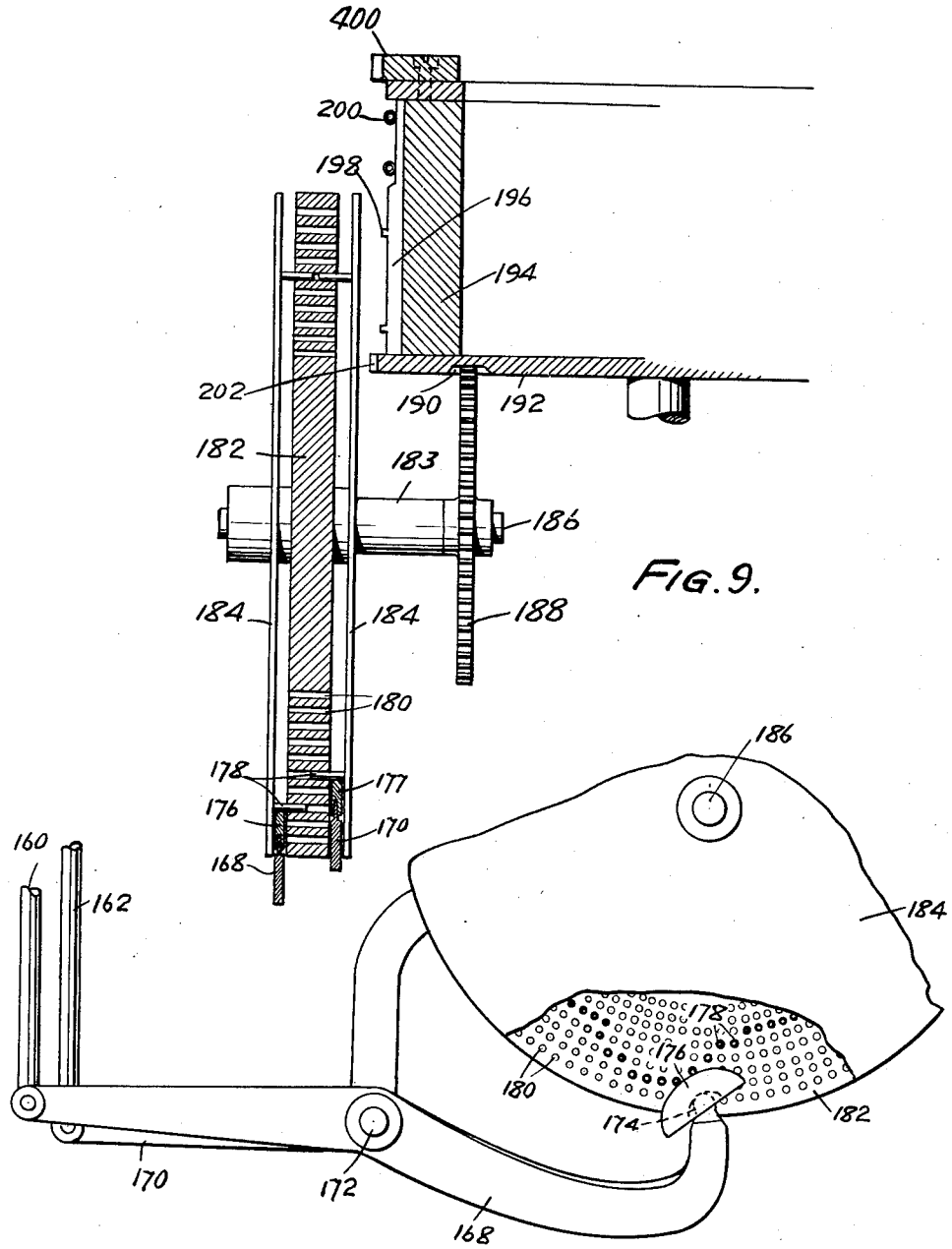
Figure 9 is a fragmentary sectional view showing the relationship between a selecting trick wheel and a selecting device for controlling the shogging of the wrap finger carriers.
Figure 10 is a fragmentary elevation, with a cover plate partially broken away, looking toward the right in Figure 9.

The rings 58 and 60 are driven to partake of the general rotation of the needle cylinder and about the same axis, but are adapted to be advanced or retarded relatively thereto to provide shogging of the wrap fingers relative to the needles. To secure this result, there is provided the mechanism particularly shown in Figures 1, 7 and 8, which show the upper and lower gears 62 and 64 respectively meshing with pinions 83 and 85. These pinions respectively mesh with idler gears 86 and 88, which mesh with a pinion 90 carried by the lower end of a shaft 92, the upper end of which carries the pinion 94 meshing with a large gear 96 secured to the bobbin plate 50 and driven in usual fashion by a pinion 97 (Figure 1) secured to the upper end of a jointed telescoping shaft as shown in Page et al. Patent 1,906,204 or mounted equivalently to permit tilting of the wrap head. In order to maintain the idler gear 86 in mesh with the pinion 90, it is journalled upon a pin 102 extending through slots 104 in the supporting casting and mounted in the corresponding ends of links 98 and 100, which are mounted concentrically with the shaft 92. Similarly, links 106 and 108 carry a pin 110 at a fixed radial distance from the axis of shaft 92, on which pin there is mounted the idler 88, the pin 110 also passing through suitable slots 112 in the casting.

The pinion 83 is in turn kept constantly in mesh with idler 86 by means of a pair of links 114 and 116, which maintain at a constant distance apart the pin 102 and the pin 118 upon which pinion 83 is mounted. Similarly, links 120 and 122 maintain constant the spacing between pin 110 and pin 124 upon which the pinion 85 is mounted.

The pin 118 is maintained at a constant radial distance from the axis of rotation of the needle cylinder and the gear 96 by reason of its being guided in arcuate slots 126 in the casting which are concentric with the cylinder axis. Upper and lower links 130 join the pin 118 to a yoke 132, which is secured to a shaft 134, mounted in the supporting casting, which shaft is connected through bevel gear 136 to a horizontal shaft 138 carrying an actuating arm 140. In similar fashion, the pin 124 is connected by links 142 to a yoke 144 secured to pin 146, which is connected through bevel gearing 148 to the shaft 150 carrying horizontally extending arm 152. Springs 154 and 155 are connected between the upper ends and between the lower ends of the yokes, respectively, and are arranged to urge them toward each other.

Control of the arms 140 and 152 is effected through the medium of push rods 156 and 158 adjustably pivoted to these arms and preferably threaded at their lower ends, which extend slidably downwardly into tubes 160 and 162. On the threaded portions of the push rods 156 and 158 are located adjustable nuts 164 and 166, limiting the telescoping action between the rods and the tubes. This arrangement is provided since the entire assembly of the dial and its associated parts and the wrapping mechanism including the bobbin plate, the wrap finger carriers and the actuating gear mechanism just described are mounted in conventional fashion as indicated above, to tilt upwardly away from the needle cylinder to afford access thereto. When such tilting takes place, the push rods 156 and 158 may withdraw partially from the tubes 160 and 126, while at the same time the actuating connection is automatically restored when the tilted parts are brought to normal operating position.

The tubes 160 and 162 are pivoted to levers 168 and 170, respectively, mounted upon a fixed pin 172 and provided at their forward ends with rounded portions indicated at 174 on which are mounted pin followers 176 and 177, respectively, arranged to be engaged by pins 178 selectively carried in holes 180 in a disc 182. Cover plates 184 are adapted to be clamped over the pins 178 located in the disc 182 to hold the pins in position and also to provide races within which the followers 176 and 177 may move during operation. As indicated in the drawings, the disc 182 is provided with a large number of holes in which the pins may be selectively located, depending upon the type of pattern which the machine is to produce. As will be evident hereafter, the positions of these pins are not very critical, and consequently the holes need not be specifically laid out with definite circumferential indexing. Alternatively to this arrangement, there may be provided radial slots in which are located butt carrying elements outlining, like the pins, cam surfaces to be followed by the ends of levers 168 and 170.

The disc 182 is carried by a shaft 186 mounted in a bracket 183 secured to the machine frame, which shaft carries the pinion 188 the teeth of which are arranged to mesh with teeth 190 produced by slotting the lower disc 192 of a pattern drum 194, which is of conventional type. This pattern drum or trick wheel is provided with axially extending slots in which are adapted to be arranged pattern elements 196 containing selectively arranged butts 198 and held in position by one or more spring bends 200. The lower disc 192 is provided with ratchet teeth 202, whereby the drum may be stepped about to control, in the present machine, both the selection of wrap fingers and needles for wrapping and the production of reverse plating.

The selection of wrap fingers is effected by the mechanism disclosed particularly in Figures 11 to 17. Follower levers 204 and 206, pivoted at 208, and forming two out of a large group of levers which will be hereafter referred to, are arranged to be engaged by butts 198 of different lengths at corresponding levels on pattern elements 196 and are connected by links 210 and 214 to arms carried by nested shafts 216 and 220 which, in turn, at the opposite side of the machine carry arms 222 and 230. The arm 222 is provided with an adjustable screw 224 which is arranged to engage a member 226 carried by the lower end of a push rod 228. The lever 230 is provided with a pivoted pin 231 through which extends a push rod 232 which, at its upper end is pivoted to a lever 234 mounted on a pin 236. A spring 233 reacts between the pivoted pin 231 and collar 235 on rod 232 to effect strong but yielding upward thrust of the lever 239 upon rod 232, the expansion of spring 233 being limited by a stop collar 237. A spring 239 urges lever 230 downwardly and the butt 198 acts to move the push rod 232 upwardly against the action of this spring. In the case of lever 222 a strong spring 238 capable of overcoming spring 256, later described, urges lever 222 and rod 228 upwardly as permitted by the absence of a butt or the presence of a butt of reduced height in the trick wheel. It will thus be seen that a longer butt controlling rod 232 serves to move it upwardly while a longer butt controlling rod 228 permits it to move downwardly.

The mechanism controlled by the push rod 228 is illustrated in detail in Figure 12. The upper end of the push rod engages the lower side of an ear 240 extending from a sliding sleeve 242 mounted upon an upright fixed rod 245. The sleeve 242 carries a plate 244 provided with a cam edge 246 arranged to engage those butts of the wrap fingers which move at the lower pair of levels mentioned above. A guide rod 250 carried by a suitable fixed bracket is embraced by an opening in an arm 252 carried by plate 244 to prevent rotation of the sleeve 242 and its assembly about the pin 245 as vertical sliding takes place. The sliding assembly is normally urged downwardly by a spring 256, weaker in its effect than spring 238, which exerts a tension between the assembly and the bracket 259 which supports the lower end of the rod 245.

Figure 13:
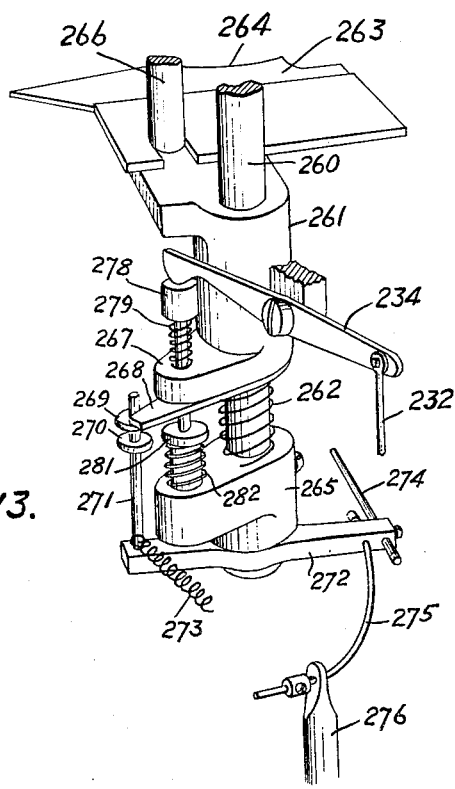
Figure 13 is a perspective view showing another of the wrap yarn selecting cams and its operating devices.

The mechanism controlled by the rod 232 is illustrated primarily in Figures 13 and 14. A vertical fixed rod 260 serves as a guide for a slide 261 urged upwardly by a light spring 262 and carrying a cam 263 provided with an edge portion 264 adapted to engage the butts of the wrap fingers located at the levels of the upper pair. A fixed guide rod 266 passing through an opening in the assembly serves to prevent its rotation about the axis of the rod 260. The slide 261 is provided with an ear 267, carrying an extension 268, which is arranged to engage selectively discs 269 and 270 formed on an upright post 271, secured to a lever 272, which is mounted on an extension of the fixed post 260 below a bracket 265, fixedly secured to the post. The lever 272 is urged in a counterclockwise direction as viewed from above by a spring 273 and carries a pin 274 projecting inwardly across the circle of needles in a position to be engaged by the portions of wrap fingers below their pivots when their lower ends are projected outwardly. (See the modification of this apparatus illustrated in Figure 29). A wire 275 extends through the lever 272 and is provided with a head whereby through movement of the post 276 lever 272 may be rocked in a clockwise direction as viewed in plan for the purpose of removing the pin 274 from the paths of any wrap fingers which may be projected.

A pin 277, provided with a head 278, is slidably mounted in the arm 267 and is urged upwardly by a spring 279 into contact with the end of lever 234. The lower end of the pin 277 extends into a bore 280 provided in a plunger 281, which is in turn guided in a bore 283 in the bracket 265. The plunger 281 is urged upwardly by a spring 282 stronger than the spring 279, the upward movement of the plunger being limited by nut 284 carried by a threaded extension of the plunger and arranged to abut the lower side of the bracket 265. The spring 279 is intermediate in strength between the springs 282 and 262 to effect the control operations hereafter described.

The present machine contemplates the shogging of the wrap fingers through very substantial angles relative to the needle cylinder and in the production of patterns in which such considerable ranges of shogging are involved, it sometimes happens that the wrap yarn may extend through a considerable circumferential extent of the socking between a point where it was previously knit to a point where it is next to be taken by the needles. In the wrapping operation, therefore, the yarn may occupy a chord with respect to the needle circle subtending such a circumferential angle that the needles in rising at the wrap point may move upwardly behind, rather than in advance of, the portion of the wrap yarn extending across the needle circle so as to miss it, this being true, of course, only when the wrap finger as it moves the yarn for new engagement by the needles, is substantially in advance, in the direction of rotation, of the needle which last knit the yarn. To correct this condition, there is provided a yarn placing device particularly illustrated in Figures 18 to 22. Such a device may be located at both wrap points in the machine or only one if the patterns which are produced are such that the chordal path of the wrap yarn which would cause the needles to miss it would occur only at the one wrap point. In the present machine, the placer is illustrated as associated with the first wrap point or station only, there being contemplated a set-up of the patterning mechanism which would avoid its necessity at the second station. For the majority of patterns, in fact, this is not a restriction, since the operations may be so controlled that the undesirable chordal condition of the wrap yarn occurs at only one station.

Abutments 292 and 294 of usual type are provided in the form of members extending inwardly across the needle circle. The abutment 292 carries the wrap horn 299, which extends approximately to the circumferential position of the abutment 294. The support 297, which also extends over the needle circle, carries the usual wrap guard or horn 301 (see Figure 2), extending past both abutments in the usual fashion. The abutment 294 carries the horn 296. See, for example, my Patent 2,263,492, dated November 18, 1941, and the patent to Page et al. 1,906,204, dated April 25, 1933, as illustrative of an equivalent arrangement of guards and wrap horns for carrying out in improved fashion the general method of effecting wrapping disclosed in the patent to Taggart 2,025,913, dated December 31, 1935. The functions of these guards and the temporary engagement of the wrap yarn by the abutments for seizure by the needles is conventional in the present machine and need not be further described.

A bracket 298 supports a pin 300 with its axis sloping upwardly in the direction of rotation of the needle cylinder, to which pin there is adjustably secured a member 302 provided with ears 304 and 306 into the latter of which there is threaded an adjustable abutment screw 308. The ear 304 and the abutment screw 308 provide steps for an extension 312 of an element 310 pivoted upon the pin 300, which element carries a placer arm 314 having a deflected end 316 extending in the direction of motion of the needles. A spring 318 is housed within a cap 320 secured to the pin 300 and between this cap and the element 310 there is provided a spiral spring 318 serving normally to urge the element 310 into engagement with the abutment screw 308. The element 310 pivotally carries in a hole 324 therein an arm 322, having the shape illustrated in the figures, which is urged in a counterclockwise direction as viewed in Figure 21 by a spring 326 into contact with a stop pin 328.

The operation of this device will be apparent from Figures 18, 19, and 20. As a wrap finger 329, adapted to effect wrapping at the first abutment, approaches the wrapping position as illustrated in Figures 18 and 19, its lower end moves outwardly under the action of cam 246 previously described, and in such movement, clears the arm 314, but engages the arm 322 which, as illustrated, is slightly beyond the arm 314 and slightly above the same, when the elements are in their rest positions. As rotation continues, the wrap finger swings the arm 322 in a clockwise direction (Figure 20) and, the spring 326 exerting a stronger tension than the spring 318, the element 310 will rotate clockwise, the stop pin 328 initially remaining in engagement with the arm 322. The deflected end 316 of the arm 314 is at such level that the wrap yarn carried by the finger 329 will be engaged by the arm 314 above the end 316, and as the wrap finger rotates with the needle cylinder and moves outwardly, it will, by engagement with the forwardly deflected portion of the arm 322 cause a movement of the element 310 at such angular rate as to cause the point of engagement of the yarn with the arm 314 to move faster than the adjacent needles in a forward direction. The result is that the yarn is swept to a position, in advance of the first rising needle which is to take it, to extend approximately radially across the needle cylinder, the deflected end 316 of arm 314 preventing any possibility of the yarn's dropping below the level of the arm 314. Due to the sloping position of the pin 300 with respect to the axis of the needle cylinder, the end 316 of the yarn 314 also moves downwardly to insure definite positioning of the yarn in a path to cause it to engage the abutment 292. At substantially the moment the yarn first engages the abutment, the tail 312 of the element 310 will engage the ear 304, so that clockwise movement of the element is arrested, whereupon the first raised needle of the group to be wrapped will engage the yarn, effecting the beginning of the wrapping operation in conventional fashion. It will be evident that the placer 314, in effect, does no more than insure that the yarn extends substantially radially across the needle circle rather than in the form of a backwardly extending chord from the yarn finger, which might result in its being missed by the needles and in its improper presentation to the abutment.

After the tail 312 of the element 310 engages the ear 304, the wrap finger will continue to move the arm 322, which, however, may now swing away from the abutment pin 328 against the tension of the spring 326, the wrap finger ultimately clearing the arm 322, which will be snapped back by the spring 326, after which the spring 318 will return the placer elements to their original positions, this, however, following the safe engagement of the yarn by the needles.

In Figures 23 and 24 there are illustrated devices cooperating with the sliders 28 to secure the proper positioning of needles for the transfer of loops from the dial needles to the cylinder needles at the end of the formation of a rib top. To secure this result, which will be described in greater detail later, the sliders 28 are differentiated, as indicated in these figures, by the fact that those associated with lowered cylinder needles which were not knitting in the formation of the rib are provided with vertical outer edges throughout their heights, as indicated at 28b, while those, 28a, which are associated with needles which were knitting during the formation of the rib top have the upper portions of their outer edges cut away, as indicated at 330. A cam 332 pivoted on a fixed vertical pin 334 is located at such height as to line up with the cut away portions 330 of the sliders 28a, so that when moved inwardly beyond the normal outer position of the ends of the sliders 28b it will engage these sliders to move them inwardly, but will fail to engage and move inwardly any of the sliders 28a. An outwardly extending arm of the lever 332 is connected by means of a Bowden wire 336 and a spring 337 to an upright push rod of conventional character (not shown) actuated by a suitable cam on the main cam drum of the machine, the inward movement of the lever 332 being limited by abutment of an adjustable screw 338 with a fixed post 340. A spring 339 normally holds the cam 332 retracted.

Figure 2:
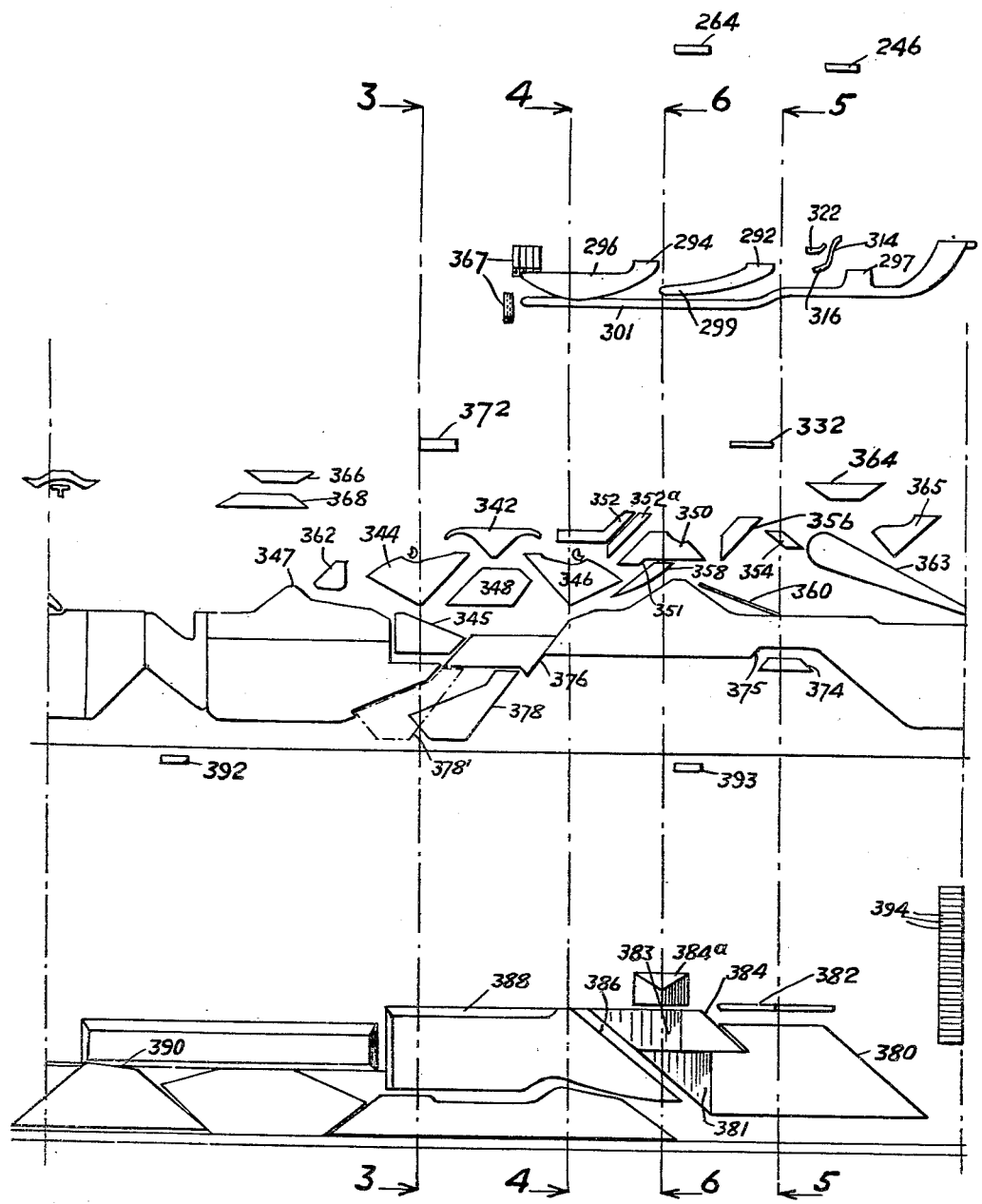
Figure 2 is an interior diagrammatic development of the cams for controlling the needles and wrap fingers and their associated parts, together with certain additional elements such as yarn feeding elements and wrap yarn controlling devices.

The cams provided to control the needles, and the pressers, needle jacks and pattern jacks associated therewith will be clear from the interior diagrammatic development of the cams illustrated in Figure 2 with respect to which the needles and their associated parts move toward the left as viewed in that figure. The cams adapted to act upon the needle butts are the top center cam 342, the forward stitch cam 344, the reverse stitch cam 346, the lower center cam 348, cams 350 and 352 and 352a, provided, respectively, to raise and lower the needles at the second wrap point, cams 354 and 356, respectively adapted to raise and lower the needles at the first wrap point, cams 363 and 365 for the control of long butt needles in the formation of heels and toes, and cams 345, 347, 358, 360 and 362 the functions of which will be described hereafter.

Arranged to act upon the butts of the presser jacks 24 are the cams 364, 366 and 368.

The cams adapted to act upon the butts 20 of the needle jacks 18 are 374, 375, 376 and 378.

Cams 380, 384, 386 and 390 are provided for action upon the steps 6 and 8 of the pattern jacks 4. A beveled upper edge 388 formed on the cam 386 is adapted to act upon the lower ends of certain of the pattern jacks to swing them inwardly as described hereafter. Cams 382 and 384a are arranged to act upon the butts 7 of the pattern jacks 4. A group of cam levers conventionalized as a series of cams 394, are arranged for selective action upon the butts 10 of the pattern jacks. Cams 392 and 393 are provided to act upon the upper butts 13 of the pattern jacks. Cams 380 and 384 are relieved as indicated at 381 and 383 for reasons hereafter described.

The postion of the cam 332 shown in Figure 23 is illustrated in Figure 2. A second cam, located in the region where stitches are drawn and indicated at 372 is also adapted to act upon the outer ends of the sliders 28, but this cam differs from cam 332 in having a sufficient vertical extent to engage the outer ends of all of the sliders of both series 28a and 28b.

A group of fingers for feeding the main yarns to the needles is indicated at 367, these fingers being arranged to be moved into and out of action in conventional fashion.

Since the principal function of the present machine is the production of wrapping associated with reverse plating, these operations will be first described, with reference thereafter to the additional operations involved in the formation of a stocking. In view of the fact that in this machine its reverse plating operations are closely tied up with the wrapping operations, it will be simplest first to describe the operations involved in wrapping, assuming initially that reverse plating does not occur, i. e., such operations as would result from the withdrawal of cam 372 from position to engage the sliders 28. The description also will first be made without reference to shogging.

As the pattern jacks pass the cam 390, they will all be brought to a common level, their upper butts 13 having been previously engaged by cam 392 to tilt their lower ends outwardly to present their pattern butts 10 for selection by the selector cams 394, the positions of which are controlled by the various butts on the elements 196 carried by the trick wheel 194 in the usual fashion, as described, for example, in my Patent 2,050,946, dated August 11, 1936. The needle jacks will at this time be engaged (through the butts 16 of the cleaning jacks, the presence of which will initially be ignored) by the upper ends of the pattern jacks 4, having been slightly raised with the pattern jacks at the location of the cam 390. The needle butts at this same time will be riding at the level determined by the cam 347, which was the last cam to act thereon. The butts 26 of the pressers 24 will be moving at the level determined by the path between the cams 366 and 368, i. e., at their upper level.

The cams 394, which control the selection of the pattern jacks, are arranged to leave the pattern jacks which pass them with their lower ends in three alternative positions, i. e. either in a fully outward position, in an intermediate position, or in a full inward position. Those jacks which are in the full outward position effect a rise of their associated needles at the first wrap point in position to take yarn thereat if yarn is presented by a yarn finger, or to effect ultimately, by reason of such rise, reverse plating, as will be hereafter described. Those jacks whose lower ends occupy an intermediate position serve to raise their associated needles at the second wrap point, or as hereafter described, to effect reverse plating on such needles. Those jacks the lower ends of which are in their innermost position will not cause their needles to rise at either of the wrap points, but will cause their needles to rise later for proper interlacing of wrap yarns, as will be pointed out.

Considering first the actions resulting from those jacks the lower ends of which remain in outer position after passing the selecting cams 394, the lower step 8 of each such pattern jack will engage and ride up the rise of cam 380. In riding upwardly, it will carry with it its needle jack 18 which, at this time, will be somewhat below its needle. The needle jack butt 20 will, by this action, be carried sufficiently high to engage cam 374. The cam 374 in turn will now engage it to cause it to raise its needle sufficiently to cause the needle butt to engage cam 354 to be raised thereover. The resulting level of the needle is that at which it is capable of taking a wrap yarn at the first abutment 292 if a wrap yarn is there presented to it. As the needle rises over cam 354, the shoulder located above its butt will engage the lower end of its presser jack 24 to move this presser jack so that the projection 25 thereon will be raised past the inner end of its slider 28, which will yield outwardly against its retaining spring bands for this action, the final position of the presser being such that the slider 28 will engage the surface 27 thereof. After taking the wrap yarn, or after passing the position at which a wrap yarn could be taken, the needle butt will engage the cam 356 to be moved downwardly thereunder. Before the needle reengages its needle jack 18, the butt of the needle jack will engage the cam surface 375, whereby it will be moved slightly downwardly to be thereafter engaged by the needle as the needle butt approaches the bottom of the cam 356, the needle jack then being moved downwardly somewhat further. This preliminary motion of the needle jack by cam surface 375 has no function in this operation, cam 375 being provided for a purpose hereafter described.

In the meanwhile, the pattern jack will have been moving over the top of cam 380 at such level that its butt 7 will engage the cam 382, which will serve to rock the jack inwardly so that both of its shoulders will clear the cam 380 and the subsequent cam 384. As a result, when the needle jack takes the final downward movement referred to above, the pattern jack will be moved slightly downwardly and will thereafter ride at the level thus determined until moved downwardly again by the needle jack.

The needle butts will now ride beneath the forward portion of the cam 350 and will be depressed slightly further by the cam surface 351 of the cam 350, after passing the cam 358, which, at this time is withdrawn from action. In the movement down the surface 351, the needle will correspondingly lower the needle jack and the pattern jack. The needle butt will then clear the withdrawn cam 346, will be raised slightly by cam 348, will take yarn from one or more of the main yarn fingers 367 and will ride down stitch cam 344 to draw a stitch. Thereafter it is raised successively by cams 345 and 347 to its original level. The needle jack butt will, prior to the needles reaching the position of the upper center cam, engage the cam 376 and then cam 378, which, during the knitting of the leg of a stocking, will occupy the full line position illustrated in Figure 2. The cam 378 will move the needle jack downwardly and with it the pattern jack, the shoulder 6 of which will engage and ride up the cam 390 after being projected outwardly by the cam 392. Thus the jack under consideration will be brought to its original position for subsequent selection by cams 394.

A jack which, after passing cams 394 had its lower end occupying an intermediate position, will be so located that its lowermost shoulder or step 8 will miss the cam 380, but its upper shoulder 6 will engage this cam and ride up the same.

As it moves upwardly, its needle jack will be moved upwardly to correspond, but in view of the difference in height between the shoulders 6 and 8, the needle jack will now not be brought to a level to engage cam 374, so that its butt will ride under that cam. As a further consequence, the needle butt will not be raised at all and will, accordingly, pass beneath cams 354 and 356 so that its needle will not be raised at the first wrap point. As the pattern jack passes along the upper surface of cam 380, its butt 7 will not be raised sufficiently to engage the cam 382, and consequently its lower end will not be rocked inwardly, so that its shoulder 6 will engage and ride up cam 384. In doing so, its needle jack 18 will be pushed upwardly and its needle will also be raised sufficiently to cause the needle butt to engage and ride upwardly over cam 359, whereby it is raised to a position to enable it to take a wrap yarn which may be presented to it at the second wrap point. Following engagement of a yarn thereat, or its passage by the point of engagement, i. e., past the second abutment, it will engage and be depressed by cam 352a, thereafter engaging and being further depressed by the center cam 342, taking a yarn or yarns from one or more of the fingers 367 and drawing stitches as it passes under the stitch cam 344. As the needle butt approaches the uppermost portion of the cam 350, it will engage and carry upwardly its presser jack 24 to the same position as that to which these presser jacks were raised at the first wrap point, as described previously. Thus beyond the second wrap point, all of the presser jacks associated with needles raised at both of the wrap points will ride at the same upper level. Before the needle now under consideration reaches the top center cam, the butt 20 of its needle jack 18 will engage and be depressed by cam 376 and then cam 378, so that it will thereafter follow the same path as the needle jacks of the needles raised at the first wrap point. By this same action, the pattern jacks will be lowered and subsequently follow the path previously described, their lower ends having been rocked inwardly by cam 384a following completion of their rise over cam 384. Subsequently they are lowered by their needles' riding down cam 352a and missing cam 386.

A pattern jack which has been pressed fully inwardly by the action of a cam 394 will miss cam 380 entirely, so that it, its needle jack and needle will ride at a constant level past cam 393, which will engage its upper butt 13 to rock its lower end outwardly, this being permitted by the cut away portions of the cams at 381 and 383. It may be noted that the pattern jacks previously described will pass the position of the cam 393 with their butts 13 well above this cam, so as not to be engaged and rocked thereby.

The pattern jack now under consideration will have its lower end rocked so far outwardly that its upper shoulder 6 will engage the cam 386, which will thereupon cause it to rise to carry upwardly first to its needle jack and then its needle until the butt of the latter follows the same level as that of the butt of a needle raised by the rise of a jack over the cam 384. The needle butt will thereafter engage the center cam 342 and the needle will take a yarn or yarns and will be moved downwardly by stitch cam 344 along with the others. Its needle jack will also engage cams 376 and 378, thereby causing its pattern jack to join the downward movement of the jacks which raise needles at the second wrap point, its lower end being cammed inwardly by the action of the bevel 388 on the upper portion of the cam 386. It will be noted that in the case of the needle last considered, there is no such rise imparted to it as will cause it to engage and raise its presser 24, which presser will accordingly ride at a lower level with the projection 25 below the inner end of its slider 28, the presser riding at this lower level until it reaches cam 368, whereupon it will be raised so that its butt takes the course with the butts of the other pressers between the cams 366 and 368.

From the above it will be evident that needles may be selected to wrap at either of the two abutments 292 and 294 in every course. Whether those needles which are selectively raised will or will not be wrapped depends upon whether or not a wrap yarn is presented in position to be engaged by them as they reach the respective abutments. As pointed out above, in the modification so far described, wrap fingers are provided with operating butts at four levels arranged to be engaged or missed selectively by cams 246 and 264. In the embodiment described, these cams are shown as individually associated with the abutments, i. e., cam 246, with the first abutment and cam 264 with the second. It will be evident, however, that both of them may be associated with either wrap point as described hereafter. These cams are controlled by selecting mechanism to occupy either operative or inoperative positions. In the case of the cam 246, the selection is accomplished through the trains of mechanisms shown in Figures 12 and 15 to 17, inclusive. The cam 246 is arranged to be moved by the plunger 228 upwardly to an inoperative position in which it misses the butts of the lower pair, or to be permitted by lowering of the rod to occupy selectively two operative positions for engaging the butts of the lower pair. The mechanism for selecting the cam 264 is somewhat more complicated by considerations growing out of the shogging and the selection of this cam will be described hereafter.

In panel wrapping, the effective sweep of the wrap yarn relative to the needles is somewhat indefinite, in the case of wrapping by the use of an abutment as herein described, the range of sweep of the wrap yarn relatively to the needles being effectively equal to the number of needles passing the forward end of an abutment before the arcuate movement of the wrap finger causes a disengagement of the yarn from the abutment, or the wrap finger is inwardly retracted, depending upon which event first occurs. In either case, if a number of needles greater than this range were all riding high in position to engage the wrap yarn, the actual number of needles wrapped would be rather indefinite inasmuch as the moment of slipping of the wrap yarn off the abutment is not well defined. Consequently, for certainty of wrapping, there are raised for a single wrapping operation only a number of needles several less than might possibly be wrapped.

The maximum extent of the wrap yarn sweep relative to the needles is fairly well defined and needles riding high beyond this will not be wrapped. This is an important factor in the operation of the present machine, since needles may be raised to wrap level not for the purpose of their being wrapped, but to effect the production of reverse plating as described hereafter.

If each wrap finger constantly occupied a definite angular relationship to the needle circle, it could present its yarn to only a limited panel.

For the production of more elaborate wrap patterns, therefore, shogging mechanism is provided to change the angular relationship between the wrap fingers and the needles about the axis of rotation. The accomplishment of this may be best made clear by consideration of the operations of the mechanisms of Figures 1, 7, 8, 9 and 10. If the yokes 132 and 144 are stationary, so that the axes of the pinions 83 and 85 are fixed, it will be evident that the wrap finger carrying rings 58 and 60 rotate at the same angular speed as the needle cylinder, the gear 96 being driven at the same rate as the needle cylinder through the connecting gear mechanism of which the upper pinion is indicated at 97, the gear ratios being so chosen as to give rise to this condition of operation. If, however, one of the pinions, say the pinion 83, is caused to move in the path defined by the arcuate slot 126, it will be evident that, with the needle cylinder rotating, the corresponding wrap finger support 58 will be advanced or retarded with respect to the needle cylinder during the period of movement of the pinion. If this motion is accomplished rapidly during only a small angular movement of the needle cylinder, the advance or retardation of the wrap finger support will take place in a quick step, and the support will thereafter rotate at the same angular speed as the needle cylinder. The movements imparted to the pinions 83 and 85 for this purpose are effected through the connections 160 and 162 and their associated parts by the pins 178 carried by the perforated disc 182, this disc being stepped about as the trick wheel 194 is advanced step by step through the conventional pawl and ratchet mechanism. It will be evident that, as a result of this mechanism, sharp shogging movements of the wrap fingers relative to the needle cylinder are produced. As indicated above, wrapping is confined to needles substantially within the range of relative movement between the needles and the wrap yarn, and in view of the leeway which is so permitted, it is not essential that the pins 178 be accurately indexed radially to correspond, for example, precisely to particular groups of needles. The arrangement of pins in the disc 182 may be readily accomplished to insure such range of movements of the wrap fingers in their various shogged positions as to wrap groups of selected needles.

As is usual in the provision of selecting mechanism in a knitting machine, the movement of a selector such as the trick wheel 194 and the disc 182 is caused to occur by a ratchet mechanism, or its equivalent, at some definite phase of the rotation of the needle cylinder and in as short a time as possible, for example during the passage by a given point of only a few needles. Ordinarily, such an advance will occur while the mechanism controlled by the pattern device is not acting upon needles or parts associated with them so as to avoid any possibility of a misoperation which might either break parts or cause a patterning defect. In the present machine, the selection of the cams 246 and 264 would offer no difficulties if the angular degree of shogging was moderately restricted. If this were the case, a set-up could be readily provided whereby the cams 246 and 264 could be shifted to new positions at some definite phase in the rotation of the needle cylinder. The present mechanism, however, is designed for a wide latitude for the shogging whereby each of the rings 58 and 60 may have imparted to it a shogging movement relative to the needle cylinder of 90° or more. There is, therefore, a possibility that when selection occurs a wrap finger may be in an active phase of its operation, engaged by one of the selecting cams so that a misoperation may occur. In fact, if a diagonal shog pattern is carried about the entire leg of a stocking, such a condition is substantially inevitable. On the other hand, by the use of two selector cams, it is possible to produce almost any desired pattern without having the condition described conflict with the operation of more than one of them. In the present machine, therefore, special provision is made to insure delayed actuation of only the cam 264, cam 246 being controlled as described above and having its movements occurring at particular phases of movement of the needle cylinder. It will be obvious, however, that the same type of selecting mechanism as is associated with cam 264 may be applied to cam 246 or to additional selecting cams if they are provided.

The control of the cam 264 will be apparent from Figures 13 and 14 considered in conjunction with Figures 15, 16 and 17. The rod 232 is moved upwardly in accordance with the selections made by the jacks in the trick wheel. The result is to cause the free end of lever 234 to press upon or release, selectively, the plunger 277 between which and the slide 261 there reacts the spring 279.

Assuming the position of the parts illustrated in Figures 13 and 14, the lever 234 will be exerting no pressure or only a slight pressure upon the plunger 277, so that the cam 264 may occupy its uppermost position under the action of spring 262, and under such conditions, will be at a level to engage a wrap finger having a butt in the uppermost position.

If, now, it is desired to shift the cam 264 to a position to engage a butt at the next lower level, movement is imparted to the lever 234 to move the plunger 277 downwardly, thereby compressing the spring 279. The degree of movement imparted to the plunger is not critical and may be such that the plunger 277 is moved downwardly beyond the desired degree of movement to be applied to the cam 264, but short of engagement of the lower end of 277 with the bottom of the bore 280 in the member 281. The application of compression to the spring 279 will not, however, effect a shift of the cam 264 immediately, inasmuch as the upper collar or disc 269 will be engaged by the plate 268 carried by the slide 261. As soon, however, as a wrap finger, the lower end of which is projected outwardly, reaches the position of the rod 274, it will engage this rod and swing the lever 272 about its axis, causing the collar 269 to disengage the plate 268, so that the slide 261 will be snapped downwardly by the spring 279, which is substantially stronger than spring 262. In general, the motion thus effected by the spring 279 will carry the plate 268 into contact with the top of the member 281, the strong spring 282 beneath which will not yield under any compression applied to the spring 279. The result is that, under these conditions, the plate 268 will occupy the position shown in the upper dotted lines of Figure 14, and as soon as the rod 274 is cleared by the wrap finger, the lever 272 will be moved counterclockwise by the spring 273, bringing the collars or flanges 269 and 270 respectively above and below the new position of the plate 268. As a result, this effective position will be maintained until another active wrap finger engages the rod 274.

If, now, it is desired to bring the cam 264 to its third and lowest position in which it will not engage any butts or wrap fingers carried by the upper ring 58, the lever 234 will be further moved to press the plunger 277 downwardly to engage the bottom of the bore 280 and move the member 281 downwardly, compressing spring 282. Again, the plate 268 will be temporarily restrained from downward movement, by the flange 270 if it occupies the intermediate position or by the flange 269 if movement is to take place directly from its uppermost position to its lowermost position. Upon engagement of the rod 274 by a projected wrap finger, however, the lever 272 is again rocked, whereupon the plate 268 is freed and the tension spring 279 will snap the plate into engagement with the upper end of the member 281 which now occupies a lower position. Immediately upon clearance of rod 274 by the wrap finger, lever 272 is rocked by spring 273 bringing flange 270 over the position of plate 268.

It will be evident that by release of the plunger 277 by the lever 234 to proper positions, the reverse action occurs upon engagement of the rod 274 by projected wrap fingers to permit the spring 262 to move the plate 268 alternatively to the two upper positions.

The arrangement described makes possible considerable latitude in the accuracy of control of the rod 232 by butts of different height on the trick wheel. If, however, the connections are carefully adjusted, it will be evident that the rather elaborate mechanism of Figures 13 and 14 will not be required, but that, instead, a plunger 278 may be moved to certain predetermined positions such that upon release of a plate such as 268, upon passage of the wrap fingers, the plate will occupy, by reason of the mere positioning of the lever 234, corresponding positions suitable for aligning the cam at its various desired levels, i. e., the movement of the free end of the lever 234 may correspond accurately with the successive levels of the cam.

By the provision of an arrangement which is tripped by the wrap fingers, as described, it will be evident that despite extreme shogging movements, selection of the cam 264 may be effected without having it change its position at a time when it is in engagement with a wrap finger butt. Only minor precautions are required to insure that the set-up is such that any finger will not trip the mechanism at the time a closely following finger would be in position to engage the shifted cam. The control for the cam 246 may be of similar nature, though generally this is not all essential, inasmuch as the two rings 58 and 60 will not usually cause an overlapping of their wrap fingers in their ranges of movement and there is thus always available a region in which one of the sets of yarn fingers does not operate within which cam selections may be made. Such region, however, will very likely be in the range of movement of the fingers carried by the other ring, and hence it is desirable to provide that selection be timed by the fingers themselves rather than by a particular phase of movement of the needle cylinders.

Figure 26:
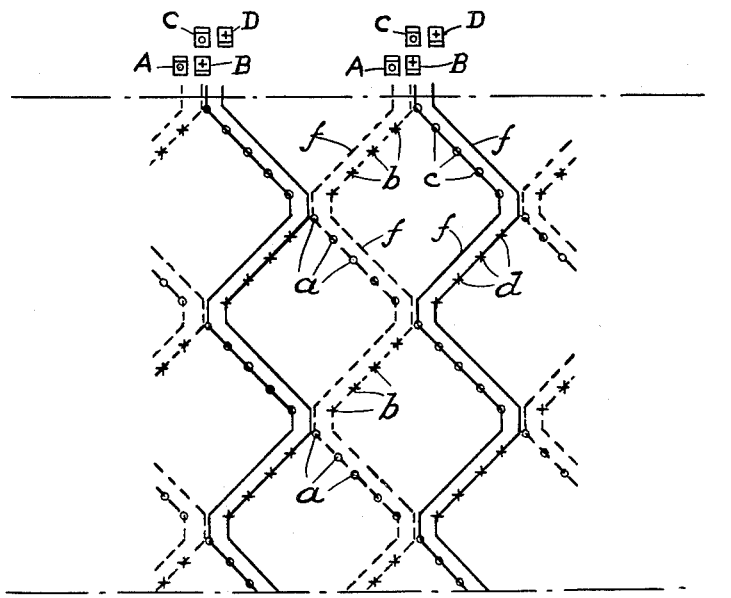
Figure 26 is a diagram illustrating in particular the fashion in which patterns may be formed by the shogging actions in the machine.

Before proceeding to a discussion of accomplishment of reverse plating in conjunction with wrapping, reference may be made to a typical pattern such as may be produced by the mechanism so far described, this being shown in Figure 26. At the upper portion of this figure there are diagrammatically indicated wrap fingers marked with circles and crosses to indicate wrap yarns, which may be of contrasting colors. The wrap fingers diagrammed at A and B are carried by the lower support 60, and those at C and D by the upper support 58. Fingers A and B are indicated as provided with butts at the lower pair of levels for engagement by said cam 246 while fingers C and D are indicated as provided with butts at the upper pair of levels for engagement by cam 264. The grouping of wrap fingers may be duplicated about the supporting rings for the production of diamond designs. The diagram of Figure 26 is intended to illustrate the wrapping of panels of needles rather than individual needles, though an individual needle may be the only one in a group of needles which may be wrapped. The wrapping of panels in successive courses or groups of courses by the finger A is indicated by the small circles $a$ extending along a dotted line indicating the path of extension of the yarn carried by the finger A. Similarly, the crosses $b$ lying along a dotted line represent panels in various courses wrapped by the yarn carried by the finger B. The circles $c$ and the crosses $d$ along full lines represent the panels in various courses wrapped by the fingers C and D, respectively. The various lines $f$ represent roughly the floats of the wrap yarns between the regions where wrapping takes place. As will be obvious from the figure, the wrap patterns may take the form of diagonal stripes of one color running in one direction and of another color running in the opposite direction and apparently intersecting each other, though on opposite sides of the intersections different yarns are actually used. These diagonals may be made up of square, rectangular or diamond shaped figures or the like depending upon the groupings of needles wrapped in successive groups of courses. It will be obvious that this is subject to wide variations dependent upon the choice of the designer and that solid or hollow blocks, groups of stripes separated by unwrapped wales or the like may be formed in each wrapped grouping. The interlacing action referred to above, it will be noted, is similar to that described in my Patent 2,263,492, dated November 18, 1941, and makes possible the formation of the types of patterns referred to particularly therein, i. e., color in color designs, hollow designs, or the like, which may be disposed in various fashions. Particularly indicated by Figure 26, though by no means a limitation upon the capability of the machine, is the fact that the shogging may be carried quite extensively to form large closed diamonds.

Attention may be called particularly to the fact that if an intersecting diagonal pattern is formed to provide diamonds, it is possible to have only one yarn wrapped into each vertex of the diamond figures.

The interruption of patterning is desirably accomplished in the present machine by interrupting the selection of needles while permitting wrap fingers to have idle movements, for example in the formation of courses constituting the foot portion of a stocking wherein patterning is desired in the instep but not in the sole. The non-selection of needles is accomplished merely by causing one of the levers 394 to be pushed inwardly to engage butts carried by the pattern jacks associated with sole needles only, this being accomplished under control of a cam on the main cam drum of the machine brought into action during the formation of the foot portion of a stocking. All of the wrap fingers may still be operated, those which are in, or enter into, the region of instep needles finding raised selected needles to take their yarns to continue a leg pattern.

From the description of the selective needle paths, it will be obvious that the presser jacks 24 associated with all needles which are selected upwardly will have been raised so as to pass the knitting point at an upper level, at which level sliders 28 will engage their surfaces 27 below the projections 25 provided for the usual purpose of preventing accidental downward or upward movements of the presser jacks by friction with the needles. At the point where stitches are drawn, during the knitting of plain fabric, each cleaning jack 14 will be at a level to provide a fulcrum for the blending of its associated needle, this positioning of the cleaning jacks being hereafter described. Consequently, if the cam 372 is in its inner position to engage the sliders 28, each needle which had been upwardly selected at either of the abutments will be deflected to produce reverse plating of a plurality of yarns fed thereto by one or a pair of the yarn fingers 367, a pair of yarns being conveniently fed from a single yarn finger through a pair of openings therein if the reverse plating is to be uniform throughout the leg and instep portions of a stocking. This reverse plating will, of course, occur on any needles which have been wrapped at either of the wrap points, though the reverse plating in this case will underlie the wrapping so that it will not be evident upon casual inspection of the face of the stocking. Additionally, reverse plating will occur upon any needles which were selected upwardly but which were not wrapped owing to their being out of range of relative movement of any wrap yarn.

From these considerations it will be seen that a combination of wrapping and reverse plating may be provided with very great possibilities for the production of intricate designs. For example, in the machine as disclosed, certain needles may be raised at the first wrap point to receive wrap yarns within the range of which they extend. On the other hand, other needles may be raised at this first wrap point for the sole purpose of selecting them for reverse plating. In the same fashion, needles may be raised at the second wrap point for both wrapping and reverse plating. If reverse plating is to be effected on unwrapped needles which are immediately adjacent needles wrapped at the second wrap point, such needles on which reverse plating is to occur may be selected at the first wrap point and will, of course, not be in raised position to receive the wrap yarns fed at the second wrap point. The reverse condition may be secured, as will be obvious, by interchanging the selectivity and feed of wrap yarn. The patterning accomplished in this fashion has only one substantial limitation, namely, in accomplishing reverse plating on needles lying between closely adjacent wrapped panels, which are wrapped, respectively, at the two wrap points. In such case, these intermediate needles which are to effect reverse plating dare not be raised at either wrap point, since they may accidentally engage one or both of the wrap yarns. In order to overcome this difficulty, it is only necessary to provide the presser jacks 24 with butts 26 of several different lengths and to make cam 364 retractible to various extents so as to selectively engage or miss the butts of these presser jacks. Under such circumstances, if cam 368 is in action (normally it may be a fixed cam, though it may be movable to afford selection possibilities) and extends sufficiently far inwardly to engage all of the butts of the presser jacks to raise them to reverse plating level, the cam 364 may effect a reasonable degree of selection by moving only certain ones downwardly. While this selection is of an additive nature, and consequently not in itself designed for elaborate patterning, if, as in the present case, it is provided merely as a complement to the elaborate selection which may be effected through the medium of the pattern jacks, it makes possible the formation of very complicated patterns with no substantial limitations upon patterning freedom.

Figure 27:
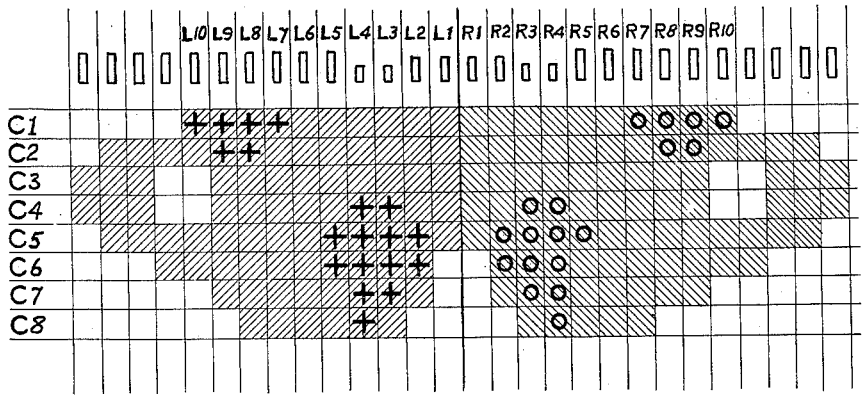
Figure 27 is a diagram illustrating the fashion in which selection of needles for wrapping and reverse plating is effected, as well as the fashion in which an auxiliary device operates to secure certain selections under conditions wherein the primary selecting means is insufficient for the purpose.

In order to make clear the selecting action thus resulting, and the fashion in which difficulties are overcome, reference may be made to Figure 27, in which the columns and rows represent, respectively, wales and courses of a portion of the fabric, there being illustrated a symmetrical pattern, of which the wales to the left hand side of the line of symmetry are designated L1 to L10, respectively, and those to the right R1 to R10, respectively. The successive courses are C1 to C8. Those loops which are reverse palted are indicated by shading, it being understood that the same color appears in the left hand and right hand portions of the design, though the shading is shown running in different directions to distinguish the various selections for the reverse plating. The loops wrapped by one wrap yarn at the first wrap point are marked by crosses and those wrapped at the second wrap point by another wrap yarn are marked by circles.

Referring to the needles and associated parts for the purpose of this description by the same reference characters as the wales which they form, the arrangement of presser jack butts is indicated across the top of the figure. Those presser jacks including and to the left of L5 and including and to the right of R5 are provided with full length butts. The presser jacks in the positions L1, L2, R1 and R2 are provided with shorter butts. Those in the positions L3, L4, R3 and R4 are provided with still shorter butts. If the cam 364 is in its innermost position, it will, thereafter, engage all of the presser jacks illustrated. If moved outwardly slightly, it will engage only those having the two longer butt lengths, while if moved further outward, it will engage only those having the longest butts.

In the formation of the first course C1, needles L7 to L10, inclusive, and needles R1 to R6, inclusive, are selected upwardly at the first wrap point, cam 364 being all the way in to engage the butts of all of the presser jacks. Needles L7 to L10, inclusive, within the range of a wrap yarn at the first point will be wrapped. Needles R1 to R6, inclusive, however, are out of range of this wrap yarn and will not be wrapped. A similar action but reversed as to wrap points occurs with respect to needles R7 to R10 and L1 to L6, inclusive.

The formation of course C2 is similarly carried out, though of the left hand set of needles only L8 and L9 will be raised at the first wrap point, and of the right hand set only R8 and R9 at the second wrap point. In this course, the needles L7 and L10 will be raised for reverse plating selection at the second wrap point along with needles L1 to L6, and similarly needles R7 and R10 will be raised at the first wrap point along with needles R1 to R6. It will be obvious that needles beyond these may be selectively raised for reverse plating, in any desired fashion, as indicated, during the formation of the various courses.

In course C3, wrapping may be eliminated altogether in the region of the fabric illustrated and needles L1 to L9 selected at the second wrap point for reverse plating, while needles R1 to R9 are selected at the first wrap point for reverse plating. Again other needles beyond these may be selected for reverse plating. If, now, cam 364 is shifted outwardly to engage long butts only, the presser jacks L1 to L4 and R1 to R4, inclusive, raised in the formation of course C3 will not be lowered by cam 364 as they pass it and approach the knitting point for the formation of course C4. (It may be noted that the upper position of these presser jacks might have been secured by the action of cam 368 if they had not been already raised due to needle selection.) In the formation of course C4, therefore, needles L3 and L4 will be selected and wrapped at the first point, needles R3 and R4 at the second point, needles L5 to L9 will be selected at the second point, and needles R5 to R9 will be selected at the first point, the latter two selections being for reverse plating only. This operation assumes that the needles L5 to L9 are out of range of the yarn wrapping needles R3 and R4 and that needles R5 to R9 are out of range of the yarn wrapping L3 and L4. Needles L1, L2, R1 and R2, however, may be assumed to be within the range of both wrap yarns and consequently could not have been selected for reverse plating at either wrap station. It is for this purpose that their presser jacks were selected, i. e., permitted to remain raised, through the positioning of cam 364.

In passing to course C5, the only change involved is the additional wrapping of needles L2 and L5, and R2 and R5, at the first and second wrap points, respectively. With cam 364 still in the same position to engage long butts only, the sliders associated with needles L1 and R1 still remain raised for reverse plating, sliders L2, L3 and L4 and R2, R3 and R4 also, of course, remaining raised. In this particular course, needles including and beyond L10 and R10 are also selected at the wrap points for reverse plating.

To produce course C6, the same set-up is followed with the exception that cam 364 is now moved in to engage presser jacks L1, L2, R1 and R2. Under these conditions, when knitting occurs, presser jacks L1 and R1 will not be in raised position, though jacks L2 and R2 will be raised by reason of the selection of the corresponding needles for wrapping.

For the formation of course C7, cam 364 is again withdrawn to engage long butts only. If, at the same time, cam 368 is withdrawn, as may be accomplished through its connection to a pattern lever controlled by the trick wheel in addition to its connection to the main cam drum of the machine, (or has theretofore not been in action at all through the formation of the leg of the stocking) presser jacks L1 and R1 will remain down, but presser jacks L2 and R2 will remain up by reason of their upper position in the formation of the preceding course.

In the formation of course C8, cam 364 is moved inwardly to engage all but the shortest butts, whereby the presser jacks L2 and R2 are additionally lowered.

It will be obvious from the above that the selection of the presser jacks may be made dependent upon the positions of cam 364 (and also of cam 368 if it is desired to manipulate this cam for selective action on the presser jack butts) as well as upon the pattern jack selections so that very elaborate patterning may result.

While the distinguishing lengths of butts of the presser jacks may be used for purposes such as those described, these variable length butts are useful for other desired controls and the butts may be distributed in the series of presser jacks to secure a wide variety of results. For example, for the purpose of filling in areas such as the region between closely wrapped portions as in Figure 27 (or the region 476 which will be described in connection with Figure 31), an arrangement may be adopted whereby in association with the needles of the instep series knitting such a region, there will be presser jacks having short butts and in association with the needles in the sole series knitting similar regions, there will be presser jacks with intermediate length butts. The remaining presser jacks in the set up will be long. Under these circumstances, the cam 364 will be in its innermost position during the knitting of the leg of the stocking except when such regions are to be filled in, under which circumstances it will be withdrawn sufficiently far to miss the intermediate length butts, with the result that the pressers having both short and intermediate butts will remain up to effect reverse plating. In the knitting of the foot, where there is to be no filling in of areas such as those mentioned, cam 364 will again be in its innermost position to lower all of the presser jacks, while during the knitting of filled-in regions, it will be withdrawn only sufficiently to miss short butts, with the result that it will depress both long and intermediate butts and thereby prevent reverse plating by the pressers in the sole having intermediate length butts. At this same time, to produce a plain sole, selections of pattern jacks are avoided by causing one of the levers 394, under actuation of the main cam drum, to cause all of the pattern jacks associated with sole needles to be forced inwardly to miss the selecting cams. Thus a plain sole with no reverse plating may be produced while the cam 364 is, nevertheless, able to effect reverse plating in those regions in which selection of presser jacks is not possible by selection of needles at either of the wrap points.

Figure 25:
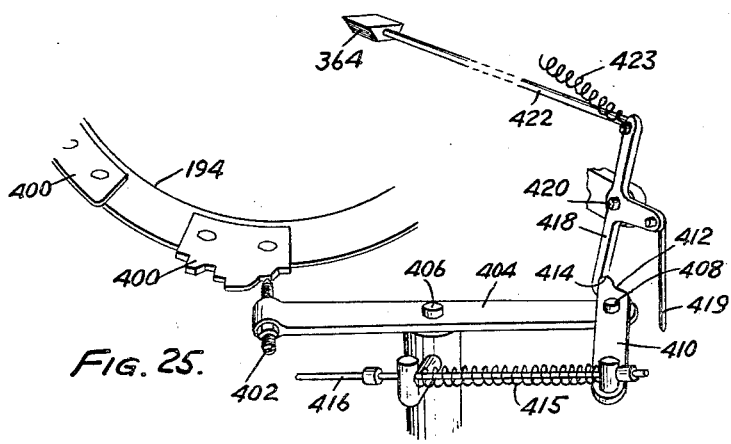
Figure 25 is a perspective view showing the controlling means for a cam arranged to operate selectively upon the butts of presser jacks.

For the purpose of controlling cam 364, there may be utilized the mechanism disclosed in Figure 25, a mechanism substantially duplicating this being provided for control of cam 368 if it is desired to effect a selective action on presser jack butts by the use of this cam. Cams 400 are secured to trick wheel 194 (see also Figure 9) and are provided with suitable rises and steps for the control of an adjustable follower screw 402 carried by lever 404 pivoted upon a fixed post at 406 and carrying at its outer end upon pivot 408 a cam lever 410 having its position controlled in opposition to the action of a spring 415 by means of a Bowden wire 416 extending to a plunger or rod of the usual type adapted to be acted upon by cams on the main cam drum of the machine. The cam 410 is arranged to engage the lower end of a lever 418 pivoted at 420, to the upper end of which lever there is connected a link 422 which may be directly or indirectly connected with cam 364 to operate the same in opposition to a suitable spring 423. The cam 410 is shiftable to cause portions 412 or 414 selectively to control the lever 418 to provide, for example, such a selection as has been described in connection with the formation of a plain sole, i. e., the controlling trick wheel may step about during the formation of the foot portion of the stocking just as in the formation of the leg portion to continue a repetition of the pattern through the instep. But by shifting the cam 410 from the main cam drum of the machine, it is possible to effect a selection such that pressers which, with the portion 412 of the cam contacting levers 418, would be engaged by the cam in the formation of the foot will not be engaged when the portion 414 of the cam is engaged with the lever in the formation of the leg. It will be evident that by suitable arrangements of butt lengths, and the control cam 410, various differences may be effected in the knitting of the instep and sole or other parts of the stocking. In order to withdraw the cam 364 fully to cause it to miss all of the butts, as for example, during the transfer operation following the knitting of a rib top, the link 419 is provided to rock the lever 418, being actuated from the main cam drum of the machine. Under such circumstances, the presser jacks raised by the action of cam 368 will remain at pressing level.

The operations of the cleaning jacks may now be described. Their functions are generally similar to those described in my Patent 2,163,461, referred to above, though in the present machine they have a special function during heel, toe and rib knitting. As was described heretofore, the butt 16 of each cleaning jack lies between the corresponding pattern jack and needle jack. Consequently, it partakes of the combined movements of the pattern and needle jacks and as the various needles are raised for selection at the first and second wrap points, and for interlacing by the action of cam 386 all of the cleaning jacks are raised to their highest cleaning levels, this rise, of course, taking place at slightly different times for the various jacks depending upon the selection or non-selection of the needles with which they are associated. During leg knitting, cams 376 and 378 successively lower the needle jacks and with them the cleaning jacks which, at their lowermost position, attained immediately prior to the drawing of stitches, are located to act as fulcra for the deflection of the upper ends of their associated needles by the presser jacks. (See Figure 3.)

In the knitting of the heel and toe as well as the rib, the cam 378 is moved to the construction line position indicated in Figure 2 at 378', this cam being mounted for sliding circumferential movement about the needle cylinder under the action of connections to a plunger operated upon by the main cam drum of the machine. When in this position, the depression of the needle jacks and their associated cleaning jacks is delayed so that the cleaning jacks remain in an elevated position behind the needles to give rigidity to those needles in the cylinder which are knitting in the formation of the rib as the dial needles draw stitches. Following this action, the cleaning jacks are brought down as before. During rib knitting, the active cylinder needles are selected by means of an extra cam in the group 394 which cam was controlled from the main pattern drum and works on the lowest control butt of each pattern jack associated with a needle which is to be active, every alternate pattern jack having this butt while the intermediate jacks lack it. Cam 358 brings idle needles down so that they pass at a low level where they will not take yarn. The cleaning jacks rise with the needles which are selected to be active during the rib knitting and are thereafter not lowered until the cam 378 is reached at its position 378'. The intermediate inactive needles are quite low and require no support by the cleaning jacks. Cleaning of the slots is accomplished at the same time as the location of the cleaning jacks to back up the needles as described.

The presser jacks 24 also have in the present machine a function, briefly indicated heretofore, in connection with the formation of rib tops. In previous rib knitting, as described particularly in Scott Patent 1,641,101, dated August 30, 1927, when the transfer operation was to be effected, a cam was provided to engage the hook ends of the needles as they were raised to receive loops from the dial needles to line them up so that they would pass properly through the loops. Injury to the hooks was liable to be caused by the cam thus provided. In the present machine, the same end of lining up the needle hooks is accomplished through the use of the presser jacks. A cam 332 is provided for this purpose and serves as indicated in the foregoing description of Figures 23 and 24 to engage those sliders 28, designated 28b, which are associated with the needles which were not knitting in the formation of the rib top and which were theretofore travelling at a lower level than the cylinder needles knitting the rib top. These needles are raised by the cam 360 at the time of transfer to penetrate the loops formed on the dial needles. As they move upwardly, the needles are riding approximately at the same level as for reverse plating, and consequently the inward movement of the sliders 28b will provide through engagement with the presser jacks 24 slight rearward movements of the upper ends of the needles to align them properly with the loops. Cam 364 is withdrawn during the rib formation (through downward movement of rod 419) and cam 368 is in action so that the presser jacks occupy their upper position suitable for this deflection. It will be noted that at this time the cleaning jacks associated with these needles will be riding at their lower level thus providing fulcra for the deflection of the needles. The extent to which the needles are deflected is subject to fine adjustment through the medium of the abutment screw 338. Operation of the cam 332 at the proper time is effected through the Bowden wire connection to the main cam drum. The reason for cutting away the sliders 28a is because the needles associated with them, theretofore knitting the rib, are in a position where they could not be deflected without possible damage.

It will not be necessary to go into further detail as to the knitting of rib tops, since this is accomplished, other than as to the variations above described, in the fashion set forth in said Scott Patent 1,641,101, to which reference may be made for details. Suitable cams are provided, as will be evident from Figure 2, for controlling the needle actions, including, for instance, the cam 360 referred to above and dividing cam 358, which is brought into action during the formation of the rib. During rib formation, inactive needles move under this cam 358, and below stitch cam 346, which is in action during rib formation.

It it likewise unnecessary to describe the formation of heels and toes, which takes place in conventional fashion in the formation of complete stockings on the present machine. Suitable pickers and controls are provided, as indicated in the cam layout of Figure 2. During the formation of heels and toes, cam 364 is out of action so that the presser jacks ride continuously at an upper level, being raised by cam 368.

Figure 28:
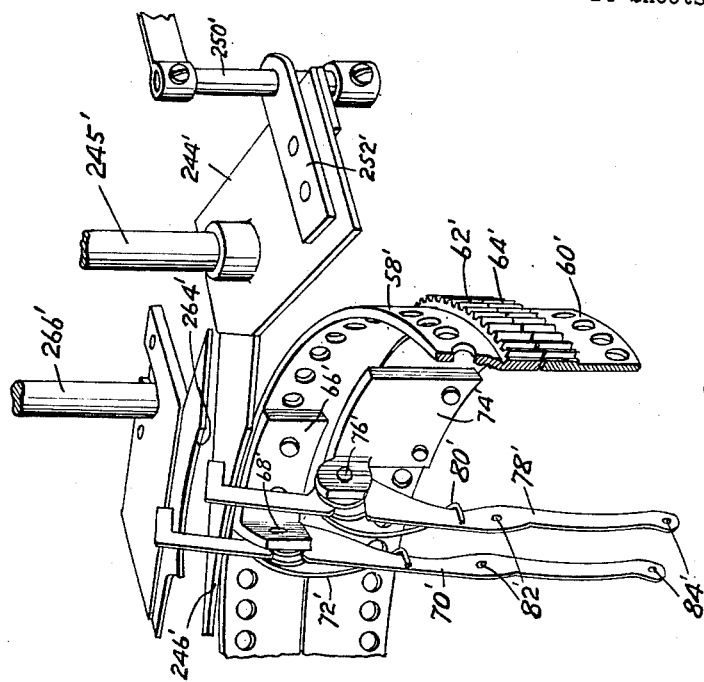
Figure 28 is a fragmentary perspective view illustrating a modification corresponding generally to that of Figure 11, but sufficing for simpler control of the wrap fingers in certain instances.

Under some circumstances, a substantial simplification of arrangement of wrap fingers and controls may be adopted, this alternative being illustrated in Figure 28. In this case, there are illustrated at 58' and 60' rings corresponding to 58 and 60 adapted to be driven through gear teeth 62' and 64'. The upper ring 58' carries brackets 66' on which there are individually pivoted at 68' single wrap fingers 70', the lower ends of which are urged inwardly by springs 72'. The lower ring 60' carries similar brackets 74', which pivotally mount at 76' fingers 78', the lower ends of which are urged inwardly by springs 80'. These wrap fingers are similar in construction to those previously described, being provided with thread eyes 82' and 84'.

In this modification, there are butts at only two levels, as indicated, those at the upper level being arranged to be engaged by a cam 264' guided by a post 266' and arranged to be moved vertically, as hereafter described. The butts of the wrap fingers carried by the lower ring 60' are arranged to be engaged by the cam 246', which is carried by a slide mounted on the post 245' and which is actuated in a fashion identical with that of the cam 246 previously described, with the exception that in this case the cam 246' need occupy only two alternative levels, at one of which it engages wrap finger butts and at the other of which it clears them. In this case, however, it will be noted that the cams 264' and 246' are located at the same circumferential position rather than at angularly spaced circumferential positions. In the modification now under discussion, these cams serve to project the lower ends of the wrap fingers at the same abutment or wrap point, which may be assumed, for example, to be the second wrap point of Figure 2, i. e., that involving the abutment 294. As a result, if the remaining elements of the machine are the same as described above, there will be a needle selecting point corresponding to the first wrap point previously described. But selections of needles at this point will be solely for purposes of reverse plating, inasmuch as no wrap yarns will be located for engagement by raised needles thereat. Thus in this modification, while the freedom of wrap patterning is more restricted, the independence of the selections for wrapping and reverse plating is increased.

An obvious alternative of this arrangement of Figure 28 is, of course, to have the cam 246' effect wrapping movements of the fingers at a first wrap point provided with an abutment 292. In such case, it amounts merely to a simplification of the more elaborate arrangement heretofore described.

Figure 29:
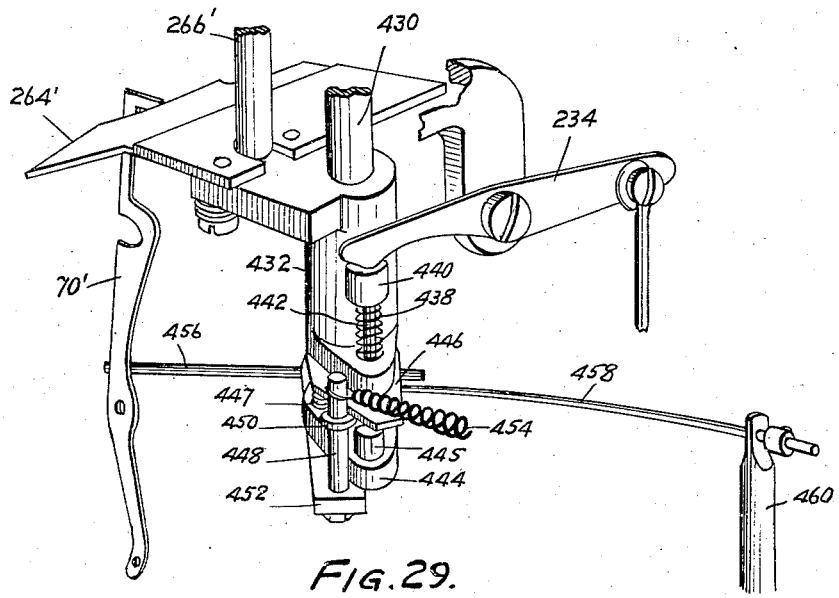
Figure 29 is a perspective view somewhat similar to Figure 13 but showing the control of a cam of the modification of Figure 28.

In the event that the cam 264' is called upon to have only two alternative positions, as in operation upon the wrap finger arrangement of Figure 28, it may be simply selectively controlled by the mechanism illustrated in Figure 29. In accordance with this figure, a supporting post 430 carries the slide 432, which supports the cam 264' prevented from rotating about 430 by the guide rod 266'. A spring 438 reacts between a laterally extending ear of the slide 432 and the head 440 of a pin 442, which is guided for vertical movement in said ear, and which is arranged to be engaged by a lever 234, which may be identical with the lever 234 previously described and similarly controlled from butts on a trick wheel, though in this case the lever 234 need occupy only two alternative positions. The post 430 at its lower end carries a fixed arm 444 provided with a stop 445 arranged to limit downward movement of a plate 446 carried by the slide 432. A post 448 is provided with a flange 450 arranged to engage the plate 446, the post 448 being carried by lever 452 pivoted at the lower end of the post 430 and carrying a pin or rod 456 arranged to be engaged by the wrap fingers as in the case of the modification previously described. A spring 454 serves to urge the lever 452 in a counterclockwise direction as viewed from above. A spring 447 is arranged to urge the slide 432 and the cam 264' to their uppermost inactive positions.

The mechanism just described is similar to that of Figures 13 and 14, but simpler, inasmuch as it is called upon to control only two alternative positions of the cam 264'. As in the case of the previous modification, the flange 450 is rocked away from the plate 446 when a projected wrap finger engages the rod 456, whereupon the slide may be moved to occupy either lower or upper position depending upon whether it is or is not subject to pressure exerted through the lever 234.

As in the case of the previous modification, a wire 458 is arranged to rock the lever 452 clockwise upon movement of an upright post 460, so as to release the cam 264' from an active position if it occupies such position at the cessation of wrapping, and also to move the rod 456 away from the wrap fingers, though adjustment is so made that normally an unprojected wrap finger will not engage this rod.

Figure 30:
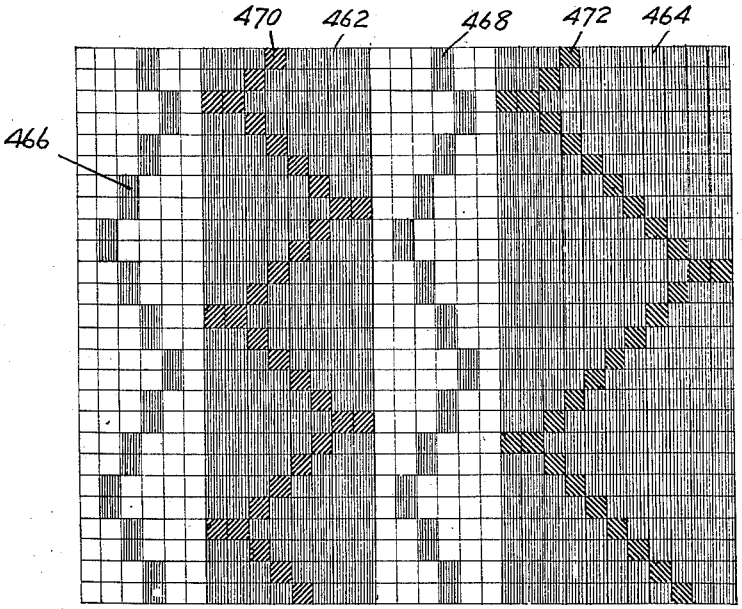
Figures 30, 31 and 32 are diagrammatic views of portions of stockings made by the use of the mechanism illustrated and showing the types of patterns producible thereby.
Figures 31, 32:
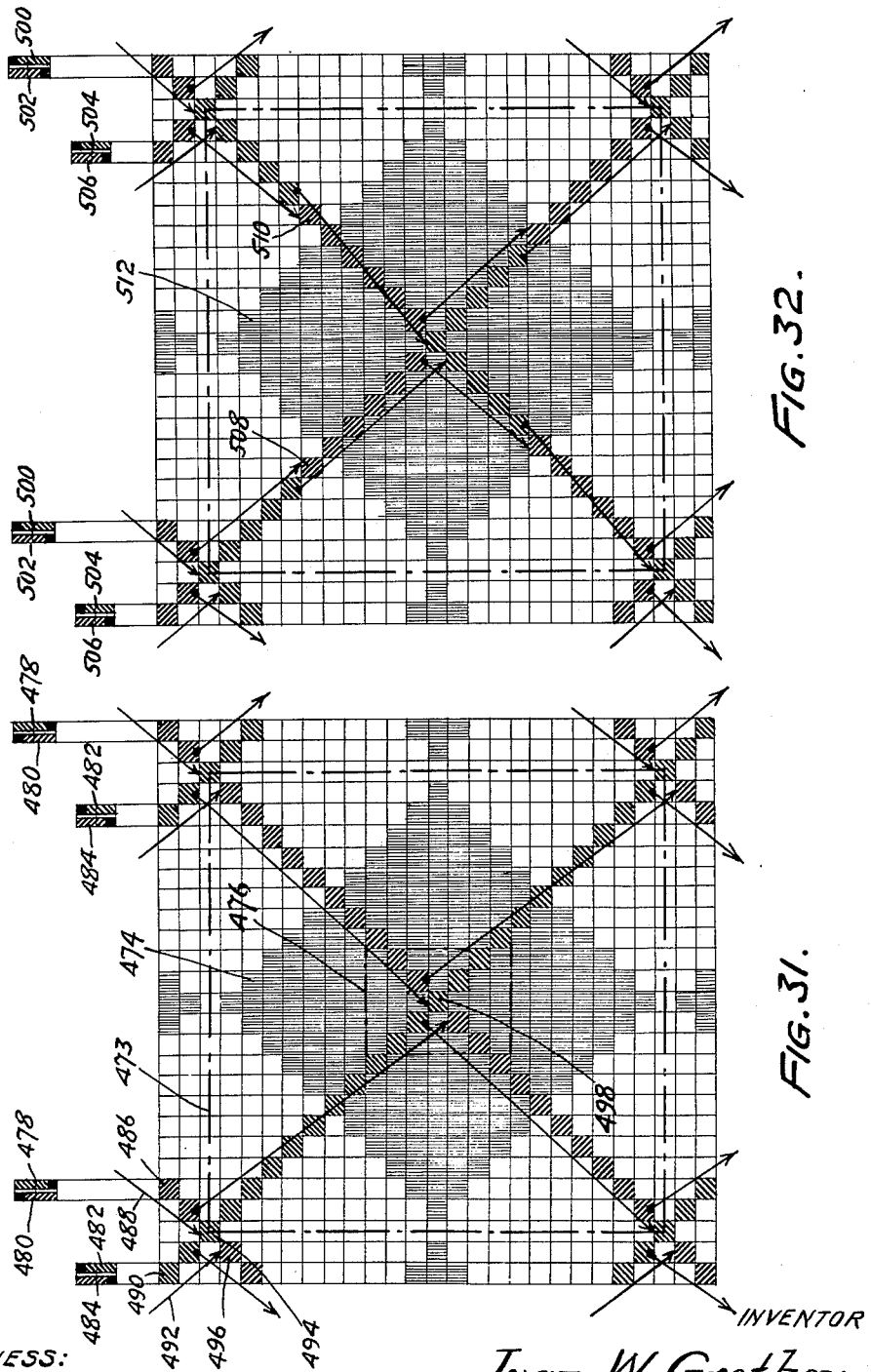

Typical patterns which may be produced by the mechanisms heretofore described are illustrated in Figures 30, 31 and 32.

In Figure 30, there is illustrated a type of pattern which may be produced by the simplified modification of Figure 28, though it may, of course, be produced equally well by the more elaborate modification of Figure 11. Assuming that it is made through the use of the modification of Figure 28, control of the needles for reverse plating to provide the zigzag designs 466 and 468 and the reverse plated panels 462 and 464, is effected at the first selection point of Figure 2, at which in this case no wrapping occurs, since no wrap fingers are projected thereat. Zigzag wrap patterns 470 and 472 are produced by independent shogging of the rings 58' and 60' and selection of needles at the second selection point, i. e., to cooperate with the single abutment 294 of this modification, the wrap fingers being projected by the cams 246' and 264'. If gaps are desired in the shogged wrap patterns, it is, of course, only necessary to shift cams 246' and 264' to their respective inoperative positions.

It will be noted that the shogging in the case of the modification of Figure 30 is independent in the case of the two rings 58' and 60', i. e., for a particular position of one wrap finger, the other need not have some certain corresponding position. This independence of modification is made possible by the completely independent control of the shogging by the two set-ups of pins or equivalent elements in the disc 182 of Figure 9. It will be evident that the pattern indicated in Figure 30 is merely illustrative of an enormous variety of elaborate patterns producible even by the simplified modification of Figure 28.

Figure 31 is illustrative of a type of pattern particularly designed to be repeated only twice in the circumference of a stocking, i. e., the pattern being a bold one of large diamonds and intersecting wrap diagonals. In this figure, the repeat of the pattern appearance is indicated by the construction lines 473. Each of the indicated squares in the case of a large pattern of this sort may be taken as wrapping an area several wales wide and several courses in length, which area may have various extents both wale-wise and course-wise, and, in fact, may reduce to a single loop, in which case, of course, the wrapping indicated would be that of individual needles rather than of panels of needles. A reverse plated diamond 474 occurs in such repeat, the right and left halves of which may be controlled by selection of needles for reverse plating at different selecting points, as was described in detail in connection with Figure 27. The rectangular region indicated at 476, however, has the reverse plating therein controlled by the selection of presser butts as described above in connection with Figure 27, inasmuch as in this region the selection of needles for reverse plating might effect their accidental wrapping by reason of the large range of movement of wrap yarns relative to the needles.

The wrapping is effected by the use of fingers 478 and 480 carried by the upper ring and fingers 482 and 484 carried by the lower ring, these fingers being arranged in pairs, carrying yarns as indicated by the hatching, and provided with butts at the levels indicated by the blackened areas. The entry of the wrap yarns for wrapping is indicated by the points of arrows and their removal by the trailing ends of the arrows. Thus, for example, the wrap yarn wrapping the series of regions 490 goes out of action in the course preceding that at which there goes into action at 498 the wrap yarn of the same color which produces the portion of the diagonal beginning with the area 494, while the diagonal running from upper right to lower left continues in the same coloring as that at 486 by the entry of another yarn at 492 beginning this continuation of the diagonal at 496. In the center of the reverse plated region, there is another shift of the wrap fingers in operation at 499.

Following the indications on the diagram, it will be evident that the intersecting diagonals of the pattern may be produced by the controls heretofore described in detail. Where diagonals of different colors overlap, as at the regions 494 and 498, only a single yarn need be included at these vertices of the pattern, this being different from prior machines, in which at such a point both yarns would necessarily be wrapped on the same needles producing in general a wrapped region differing in appearance from the remaining portions of both diagonals or other converging pattern elements.

It will be evident that the pattern of Figure 31 may be modified by interchanging the colors of yarns in the pairs of wrap fingers, for example, 482 and 484, in which case the diagonals would vary in color along their lengths. Furthermore, while a symmetrical geometrical design of the type illustrated in Figure 31 is generally of greater commercial importance, it will be obvious that the independence of controls afforded by the present machine make possible the production of completely asymmetrical designs with great freedom of color change in the wrapping and great latitude of change of shape of reverse plated areas.

One such more elaborate pattern is illustrated, for example in Figure 32, which pattern, however, is again of substantially symmetrical commercially important type. In this case, the wrap finger colors and butt set-ups are indicated at 500, 502, 504 and 506. Reverse plated areas 512 may be produced as indicated in connection with Figure 31, i. e., by selection of needles at the two selection points and the filling in of the central portion of the areas by the control of presser butts. In this case, there are indicated color changes in the diagonals, for example at 508 and 510. In the symmetrical figure illustrated, the color changes are caused by simultaneous selections of the cams at both wrap points, but obviously this need not be the case and the selections may be caused to take place entirely independently. While this figure illustrates changes of color, only at substantial intervals along the diagonals, it will be obvious that the changes may take place more frequently, so that, for example, each successive wrap area indicated by a block in Figure 32 may involve a color change producing a diagonal pattern of successive differently colored areas. It will, of course, be evident that in the case of the modifications of both Figures 31 and 32, as well as in the case of the modification of Figure 30, the indication of rectangular wrapped areas is merely for convenience of illustration, since these wrapped areas may have any type of symmetrical or unsymmetrical form determined by the selection of needles, i. e., the needles selected in successive courses may differ in number and there may be produced openings within wrapped regions or wrapping within wrapping in well known fashion and in particular by reason of the provisions for control of interlacings in the present machine.

What I claim and desire to protect by Letters Patent is:

1. A circular knitting machine comprising a needle cylinder, needles slidable in said cylinder, means for feeding a main yarn to said needles, at least two means for feeding wrap yarns to needles, means for effecting simultaneous rotation of the needle cylinder and said wrap yarn feeding means, and means for effecting independent shogging movements of said wrap yarn feeding means relative to the needle cylinder, the last named means comprising intermittently and independently movable planet gears in trains between the needle cylinder and said wrap yarn feeding means.

2. A circular knitting machine comprising a needle cylinder, needles slidable in said cylinder, means for feeding a main yarn to said needles, at least two means for feeding wrap yarns to needles, means for effecting simultaneous coaxial rotation of the needle cylinder and said wrap yarn feeding means, and means for effecting independent shogging movements of said wrap yarn feeding means relative to the needle cylinder, the last named means comprising intermittently and independently movable planet gears in trains between the needle cylinder and said wrap yarn feeding means.

3. A circular knitting machine comprising a needle cylinder, needles slidable in said cylinder, means for feeding a main yarn to said needles, at least two means for feeding wrap yarns to needles, means for effecting simultaneous coaxial rotation of the needle cylinder and said wrap yarn feeding means, and means for effecting individual shogging movements of said wrap yarn feeding means relative to the needle cylinder.

4. A circular knitting machine comprising a needle cylinder, needles slidable in said cylinder, means for feeding a main yarn to said needles, and at least two means for feeding wrap yarns to needles, the last named means comprising a plurality of rings each carrying interiorly at least one wrap finger pivoted for movement about an axis extending transversely of the axis of its ring.

5. A circular knitting machine comprising a needle cylinder, needles slidable in said cylinder, means for feeding a main yarn to said needles, at least two means for feeding wrap yarns to needles, means for effecting simultaneous rotation of the needle cylinder and said wrap yarn feeding means, means for effecting individual shogging movements of said wrap yarn feeding means relative to the needle cylinder, and means for selectively rendering operative said wrap yarn feeding means.

6. A circular knitting machine comprising a needle cylinder, needles slidable in said cylinder, means for feeding a main yarn to said needles, at least two means for feeding wrap yarns to needles, means for effecting simultaneous rotation of the needle cylinder and said wrap yarn feeding means, means for effecting individual shogging movements of said wrap yarn feeding means relative to the needle cylinder, and means for selectively presenting needles to be wrapped.

7. A circular knitting machine comprising a needle cylinder, needles slidable in said cylinder, means for feeding a main yarn to said needles, at least two means for feeding wrap yarns to needles, means for effecting simultaneous rotation of the needle cylinder and said wrap yarn feeding means, means for effecting individual shogging movements of said wrap yarn feeding means relative to the needle cylinder, and means for imparting wrapping movements to said wrap yarn feeding means at a plurality of feed points.

8. A circular knitting machine comprising a needle cylinder, needles slidable in said cylinder, means for feeding a main yarn to said needles, means for feeding a wrap yarn to needles, means for shogging the wrap yarn feeding means relatively to the needles, means for selectively controlling wrapping movements of the wrap yarn feeding means, and means dependent upon the shogged position of the wrap yarn feeding means for controlling positioning of said selective controlling means.

9. A circular knitting machine comprising a needle cylinder, needles slidable in said cylinder, means for feeding a main yarn to said needles, an element arranged to coact with said needles, means for shogging said element relatively to said needles, means movable to alternative positions to control said element selectively, and means dependent upon the shogged position of said element for controlling the positioning of said movable means.

10. A circular knitting machine comprising a needle cylinder, needles slidable in said cylinder, means for feeding a main yarn to said needles, wrap yarn feeding means comprising a movable yarn carrying element, said element carrying a butt, a cam engageable with said butt to actuate said element, means for effecting selective positioning of said cam axially of the needle cylinder to provide selective actuation of said butt thereby, and means for shogging said element relatively to said needles.

11. A circular knitting machine comprising a needle cylinder, needles slidable in said cylinder, means for feeding a main yarn to said needles, means for effecting selection of needles to cause selected needles to move in a cycle differing from that of unselected needles, and means cooperating with needles so selected and moving in the same cycle to effect the formation thereby of at least two types of stitches differing from those formed by at least some of the unselected needles, one of said types of stitches being produced by cooperation with the needles of means capable of cooperation with only a limited group thereof, said last named means being selectively operable to cooperate with different limited groups thereof.

12. A circular knitting machine comprising a needle cylinder, needles slidable in said cylinder, means for feeding a main yarn to said needles, means for effecting selection of needles to cause selected needles to move in a cycle differing from that of unselected needles, and means cooperating with needles so selected and moving in the same cycle to effect the formation thereby of at least two types of stitches differing from those formed by at least some of the unselected needles, one of said types of stitches being produced by cooperation of wrapping mechanism with the needles, said wrapping mechanism being selectively operable to cooperate with different needles.

13. A circular knitting machine comprising a needle cylinder, needles slidable in said cylinder, means for feeding a main yarn to said needles, means for effecting selection of needles to cause selected needles to move in two cycles differing from each other and from the cycle of unselected needles, panel wrapping means cooperating with a limited group of selected needles moving in one of said cycles so that such needles outside of said group remain unwrapped, panel wrapping means cooperating with a limited group of selected needles moving in the other of said cycles so that such needles outside of the last mentioned group remain unwrapped, and means for effecting reverse plating on unwrapped selected needles moving in said cycles.

14. A circular knitting machine comprising a needle cylinder, needles slidable in said cylinder, means for feeding a main yarn to said needles, means for effecting selection of needles to cause selected needles to move in two cycles differing from each other and from the cycle of unselected needles, panel wrapping means cooperating with a limited group of selected needles moving in one of said cycles so that such needles outside of said group remain unwrapped, panel wrapping means cooperating with a limited group of selected needles moving in the other of said cycles so that such needles outside of the last mentioned group remain unwrapped, and means for effecting deflection of unwrapped selected needles moving in said cycles.

15. A circular knitting machine comprising a needle cylinder, needles slidable in said cylinder, means for feeding a main yarn to said needles, means for effecting selection of needles to cause selected needles to move in a cycle differing from that of unselected needles, panel wrapping means cooperating with a limited group of selected needles moving in said cycle so that such needles outside of said group remain unwrapped, means for controlling said panel wrapping means to effect the wrapping of needles in said limited group with different yarns in different courses, and means for changing the extent of the limited group of needles cooperating with said wrapping means.

16. A circular knitting machine comprising a needle cylinder, needles slidable in said cylinder, means for feeding a main yarn to said needles, means for effecting selection of needles to cause selected needles to move in two cycles differing from each other and from the cycle of unselected needles, means effecting reverse plating by selected needles moving in both of said cycles, and means for effecting reverse plating on certain needles moving in the cycle of unselected needles.

17. A circular knitting machine comprising a needle cylinder, needles slidable in said cylinder, means for feeding a main yarn to said needles, and means for feeding a wrap yarn to said needles, the last named means comprising an element for moving the wrap yarn across the needle circle, an abutment for engagement by the wrap yarn to effect its engagement by a plurality of needles, and means for engaging the wrap yarn mounted outside the needle circle and movable to locate a portion of the wrap yarn approximately radially across the needle circle.

18. A circular knitting machine comprising a needle cylinder, needles slidable in said cylinder, means for feeding a main yarn to said needles, means for feeding a wrap yarn to said needles, the last named means comprising an element for moving the wrap yarn across the needle circle, an abutment for engagement by the wrap yarn to effect its engagement by a plurality of needles, and means for engaging the wrap yarn mounted outside the needle circle and movable to locate a portion of the wrap yarn in advance of said abutment approximately radially across the needle circle.

19. A circular knitting machine comprising a needle cylinder, needles slidable in said cylinder, means for feeding a main yarn to said needles, means for feeding a wrap yarn to said needles, the last named means comprising an element for moving the wrap yarn across the needle circle, an abutment for engagement by the wrap yarn to effect its engagement by a plurality of needles, and means operated by said element for engaging the wrap yarn to locate a portion thereof approximately radially across the needle circle.

20. A circular knitting machine comprising a needle cylinder, needles slidable in said cylinder, means for feeding a main yarn to said needles, means for feeding a wrap yarn to said needles, the last named means comprising an element for moving the wrap yarn across the needle circle, and means for engaging the wrap yarn mounted outside the needle circle and movable to locate a portion of the wrap yarn approximately radially across the needle circle.

21. A circular knitting machine comprising a needle cylinder, needles slidable in said cylinder, means for feeding a main yarn to said needles, means for feeding a wrap yarn to said needles, the last named means comprising an element for moving the wrap yarn across the needle circle, means for shogging said element relative to the needles, and means for engaging the wrap yarn to locate a portion thereof approximately radially across the needle circle.

22. A circular knitting machine comprising a needle cylinder, needles slidable in said cylinder, means for feeding a main yarn to said needles, means for feeding a wrap yarn to said needles, the last named means comprising an element for moving the wrap yarn across the needle circle, means for shogging said element relative to the needles, and means operated by said element for engaging the wrap yarn to locate a portion thereof approximately radially across the needle circle.

23. The method of knitting fabric on a circular knitting machine provided with at least two means for presenting wrap yarns to needles, each arranged to present its yarn to any needles presented in a wrapping position within a substantial angular range of the needle circle in its vicinity, comprising locating in wrapping position in one phase of the cycle of operation needles both within and without the range of one of said means, wrapping thereby needles within its range, in the same course of knitting locating in wrapping position in another phase of the cycle of operation needles both within and without the range of the other of said means, wrapping by the last means needles within its range, effecting deflection of needles so located in wrapping position in at least one of said phases and out of the range of the wrapping means corresponding thereto, and also effecting deflection of needles not located in wrapping position.

24. The method of knitting fabric on a circular knitting machine provided with at least two means for presenting wrap yarns to needles, each arranged to present its yarn to any needles presented in a wrapping position within a substantial angular range of the needle circle in its vicinity, comprising locating in wrapping position in one phase of the cycle of operation needles both within and without the range of one of said means, wrapping thereby needles within its range, in the same course of knitting locating in wrapping position in another phase of the cycle of operation needles both within and without the range of the other of said means, wrapping by the last means needles within its range, effecting reverse plating on needles so located in wrapping position in at least one of said phases and out of the range of the wrapping means corresponding thereto, and also effecting reverse plating on needles not located in wrapping position.

25. The method of knitting fabric on a circular knitting machine provided with at least two means for presenting wrap yarns to needles, each arranged to present its yarn to any needles presented in a wrapping position within a substantial angular range of the needle circle in its vicinity, and said two means being arranged to be shogged to various positions relative to the needle circle, comprising locating in wrapping position in one phase of the cycle of operation needles within the range of one of said means, wrapping thereby needles within its range, in the same course of knitting locating in wrapping position in another phase of the cycle of operation needles within the range of the other of said means, and wrapping by the last means needles within its range.

26. The method of knitting fabric on a circular knitting machine provided with at least two means for presenting wrap yarns to needles, each arranged to present its yarn to any needles presented in a wrapping position within a substantial angular range of the needle circle in its vicinity, and said two means being arranged to be shogged to various positions relative to the needle circle, comprising locating in wrapping position in one phase of the cycle of operation needles within the range of one of said means, wrapping thereby needles within its range, in the same course of knitting locating in wrapping position in another phase of the cycle of operation needles within the range of the other of said means, wrapping by the last means needles within its range, and in the formation of another course wrapping only needles located in wrapping position in the range of one of said means.

27. The method of knitting fabric on a circular knitting machine provided with at least two means for presenting wrap yarns to needles, each arranged to present its yarn to any needles presented in a wrapping position within a substantial angular range of the needle circle in its vicinity, and said two means being arranged to be shogged to various positions relative to the needle circle, comprising locating in wrapping position in one phase of the cycle of operation needles within the range of one of said means, wrapping thereby needles within its range, in the same course of knitting locating in wrapping position in another phase of the cycle of operation needles within the range of the other of said means, wrapping by the last means needles within its range, and in the formation of another course, following shogging to bring said means so closely adjacent to each other that their wrapping ranges would overlap, wrapping only needles located in wrapping position in the range of one of said means.

28. A circular knitting machine comprising a needle cylinder, needles slidable in said cylinder, means for feeding a main yarn to said needles, at least two means for feeding wrap yarns to needles, each arranged to present its yarn to any needles presented in a wrapping position within a substantial angular range of the needle circle in its vicinity, means for shogging said feeding means to positions so closely adjacent each other that their wrapping ranges would overlap, and means for selectively preventing wrapping by one of said feeding means when they are in said close relative positions.

29. A circular knitting machine comprising a needle cylinder, needles slidable in said cylinder, means for feeding a main yarn to said needles, at least two means for feeding wrap yarns to needles, each arranged to present its yarn to needles within a substantial angular range of the needle circle in its vicinity, means for shogging said feeding means to positions so closely adjacent each other that their wrapping ranges would overlap, and means for selectively preventing wrapping by one of said feeding means when they are in said close relative positions.

30. A circular knitting machine comprising a needle cylinder, needles slidable in said cylinder, means for feeding a main yarn to said needles, at least two means for feeding wrap yarns to needles, means for effecting simultaneous rotation of the needle cylinder and said wrap yarn feeding means, and means for effecting individual shogging movements of said wrap yarn feeding means relative to the needle cylinder.

31. A circular knitting machine comprising a needle cylinder, needles slidable in said cylinder, means for feeding a main yarn to said needles, at least two means for feeding wrap yarns to needles, means for effecting simultaneous rotation of the needle cylinder and said wrap yarn feeding means, and means for effecting independent shogging movements of said wrap yarn feeding means relative to the needle cylinder, the last named means comprising a pattern device intermittently movable in a rotary cycle and having independently locatable elements for controlling said shogging movements.

32. A circular knitting machine comprising a needle cylinder, needles slidable in said cylinder, means for feeding a main yarn to said needles, means for feeding wrap yarns to needles, means for effecting selection of needles both to be wrapped and for reverse plating thereon, means for effecting reverse plating on at least some of said selected needles due to said selection, and means operating independently of said selection for effecting reverse plating on unselected needles.

33. A circular knitting machine comprising a needle cylinder, needles slidable in said cylinder, means for feeding a main yarn to said needles, means for effecting selection of needles, means for effecting reverse plating on at least some of said selected needles due to said selection, and means operating independently of said selection for effecting reverse plating on unselected needles.

34. A circular knitting machine comprising two beds in which knitting elements cooperate at times to knit rib fabric, means for feeding a main yarn to said knitting elements, at least two means for feeding wrap yarns to the knitting elements in one of the beds, means for effecting simultaneous coaxial rotation of the beds and said wrap yarn feeding means, and means for effecting individual shogging movements of said wrap yarn feeding means relative to the beds.

35. A circular knitting machine comprising two beds in which knitting elements cooperate at times to knit rib fabric, means for feeding a main yarn to said knitting elements, at least two means for feeding wrap yarns to the knitting elements in one of the beds, means for effecting simultaneous coaxial rotation of the beds and said wrap yarn feeding means, means for effecting individual shogging movements of said wrap yarn feeding means relative to the beds, and means for selectively rendering operative said wrap yarn feeding means.

36. A circular knitting machine comprising two beds in which knitting elements cooperate at times to knit rib fabric, means for feeding a main yarn to said knitting elements, at least two means for feeding wrap yarns to the knitting elements in one of the beds, means for effecting simultaneous coaxial rotation of the beds and said wrap yarn feeding means, means for effecting individual shogging movements of said wrap yarn feeding means relative to the beds, and means for selectively presenting for wrapping the knitting elements on which wrapping is to occur.

37. A circular knitting machine comprising two beds in which knitting elements cooperate at times to knit rib fabric, means for feeding a main yarn to said knitting elements, at least two means for feeding wrap yarns to the knitting elements in one of the beds, means for effecting simultaneous coaxial rotation of the beds and said wrap yarn feeding means, means for effecting individual shogging movements of said wrap yarn feeding means relatively to the beds, and means for imparting wrapping movements to said wrap yarn feeding means at a plurality of feed points.

38. A circular knitting machine comprising two beds in which knitting elements cooperate at times to knit rib fabric, means for feeding a main yarn to said knitting elements, at least two means for feeding wrap yarns to the knitting elements in one of the beds, means for effecting simultaneous rotation of the beds and said wrap yarn feeding means, and means for effecting individual shogging movements of said wrap yarn feeding means relative to the beds.

IVAN W. GROTHEY.